(12) United States Patent
Tsuruta et al.

(10) Patent No.: US 7,438,166 B2
(45) Date of Patent: Oct. 21, 2008

(54) FLYWHEEL ASSEMBLY

(75) Inventors: Hiroyoshi Tsuruta, Kadoma (JP); Hiroshi Uehara, Hirakata (JP); Kozo Yamamoto, Neyagawa (JP)

(73) Assignee: Exedy Corporation, Osaka (JP)

( * ) Notice: Subject to any disclaimer, the term of this patent is extended or adjusted under 35 U.S.C. 154(b) by 261 days.

(21) Appl. No.: 11/373,236

(22) Filed: Mar. 13, 2006

(65) Prior Publication Data
US 2006/0201767 A1 Sep. 14, 2006

Related U.S. Application Data

(63) Continuation-in-part of application No. PCT/JP2004/012984, filed on Sep. 7, 2004.

(30) Foreign Application Priority Data

| Sep. 16, 2003 | (JP) | ............................. 2003-323630 |
| Sep. 17, 2003 | (JP) | ............................. 2003-324294 |
| Oct. 7, 2003 | (JP) | ............................. 2003-347721 |
| Dec. 4, 2003 | (JP) | ............................. 2003-405314 |
| Dec. 4, 2003 | (JP) | ............................. 2003-405315 |
| Jan. 26, 2004 | (JP) | ............................. 2004-017471 |

(51) Int. Cl.
*F16D 13/68* (2006.01)

(52) U.S. Cl. .................................................. 192/70.17

(58) Field of Classification Search ............. 192/55.61, 192/70.17, 213.22, 55.1; 74/574.2, 574.3, 74/574.4; 464/68.41
See application file for complete search history.

(56) References Cited

U.S. PATENT DOCUMENTS

| 4,856,636 A | 8/1989 | Mainhard |
| 4,856,639 A | 8/1989 | Fukushima |
| 5,139,124 A * | 8/1992 | Friedmann ................. 192/48.3 |
| 5,617,940 A | 4/1997 | Fukushima et al. |
| 5,634,543 A | 6/1997 | Hashimoto et al. |
| 5,772,516 A * | 6/1998 | Bonfilio .................. 464/68.41 |
| 5,784,928 A * | 7/1998 | Mokdad et al. ............ 464/68.4 |
| 6,044,727 A | 4/2000 | Yamamoto |
| 6,062,103 A | 5/2000 | Soares et al. |
| 6,213,270 B1 | 4/2001 | Jackel et al. |
| RE38,258 E * | 9/2003 | Reik et al. ............... 192/70.17 |
| 6,612,933 B2 | 9/2003 | Uehara |
| 7,159,703 B2 * | 1/2007 | Fukushima .............. 192/70.17 |
| 7,195,111 B2 * | 3/2007 | Fukushima .............. 192/70.17 |
| 2006/0185959 A1 * | 8/2006 | Tsuruta et al. .............. 192/214 |
| 2007/0099710 A1 * | 5/2007 | Yamamoto et al. ......... 464/68.1 |

FOREIGN PATENT DOCUMENTS

DE 3502229 A 7/1986

(Continued)

*Primary Examiner*—Dirk Wright
(74) *Attorney, Agent, or Firm*—Global IP Counselors, LLP

(57) ABSTRACT

A flywheel assembly that receives torque from a crankshaft of an engine includes a flywheel, a damper mechanism, and a frictional resistance generation mechanism. The damper mechanism elastically connects the flywheel to the crankshaft in a rotational direction. The damper mechanism includes an input member, an output member, elastic members to connect elastically the input member and the output member in the rotational direction. The frictional resistance generation mechanism is located functionally in parallel with the damper mechanism in the rotational direction. The frictional resistance generation mechanism utilizes a portion of the flywheel as a friction surface.

39 Claims, 24 Drawing Sheets

FOREIGN PATENT DOCUMENTS

| | | |
|---|---|---|
| GB | 2170295 | 7/1986 |
| JP | 61-248938 A | 11/1986 |
| JP | 63-132144 U | 8/1988 |
| JP | 63-214536 | 9/1988 |
| JP | 04-231757 A | 8/1992 |
| JP | 08-170650 A | 7/1996 |
| JP | 11-030292 A | 2/1999 |
| JP | 11-108116 A | 4/1999 |
| JP | 2000-502432 A | 2/2000 |
| JP | 2001-065638 A | 3/2001 |
| KR | 90-002566 | 4/1990 |
| KR | 10-0203565 B | 6/1999 |
| KR | 10-0242376 B | 3/2000 |
| KR | 2002-0025817 | 4/2002 |

* cited by examiner

FLYWHEEL ASSEMBLY

CROSS-REFERENCE TO RELATED APPLICATIONS

This application is a continuation-in-part of application of International Patent Application No. PCT/JP2004/012984 filed on Sep. 7, 2004. The entire disclosure of International Patent Application No. PCT/JP2004/012984 is hereby incorporated herein by reference.

This application claims priority to Japanese Patent Applications No. 2003-324294, No. 2003-405314, No. 2003-405315, and No. 2004-017471. The entire disclosures of Japanese Patent Applications No. 2003-324294, No. 2003-405314, No. 2003-405315, and No. 2004-017471 are hereby incorporated herein by reference.

FIELD OF THE INVENTION

The invention relates to a flywheel assembly. More specifically, the present invention relates to a flywheel assembly in which a flywheel is connected to a crankshaft through a damper mechanism.

BACKGROUND INFORMATION

Conventionally, a flywheel is attached to a crankshaft of an engine for absorbing vibrations caused by variations in engine combustion. Further, a clutch device is arranged on a transmission side (i.e., in a position axially shifted toward the transmission) with respect to the flywheel. The clutch device usually includes a clutch disk assembly coupled to an input shaft of the transmission, and a clutch cover assembly for biasing the frictional coupling portion of the clutch disk assembly toward the flywheel. The clutch disk assembly typically has a damper mechanism for absorbing and damping torsional vibrations. The damper mechanism has elastic members such as coil springs arranged to compress in a rotating direction.

A structure is also known in which the damper mechanism is not arranged in the clutch disk assembly, and rather is arranged between the flywheel and the crankshaft. In this structure, the flywheel is located on the output side of a vibrating system, in which the coil springs form a border between the output and input sides, so that inertia on the output side is larger than that in other prior art. Consequently, the resonance rotation speed can be lower than an idling rotation speed so that damping performance is improved. The structure, in which the flywheel and the damper mechanism are combined as described above, provides a flywheel assembly or a flywheel damper. Such a structure is disclosed in Japanese Unexamined Publication H04-231757, which is hereby incorporated by reference. The flywheel fixed to the crankshaft of the engine is called a first flywheel, and the flywheel connected to the crankshaft via the elastic members is called a second flywheel.

The damper mechanism used in a dual-mass flywheel has an input member, an output member, and a plurality of elastic members for elastically connecting both members. The input member is a disk-like member formed with a plurality of window holes for accommodating the elastic members. The output member is composed of a pair of disk-like members disposed axially on the opposite side of the input member. The friction resistance generation mechanism generates friction resistance when the input member and the output member rotate relative to each other to compress the elastic members in the rotational direction.

The second flywheel is supported by the crankshaft via the elastic member in the radial direction and axial direction to be movable in each direction. Therefore, when a clutch release load is applied by the clutch device to the second flywheel, the second flywheel moves toward the engine in the axial direction. It is necessary to support the second flywheel by a member on the crankshaft side. In the prior art, however, the support portion has a complicated structure so that it is difficult to provide flat surface to support the second flywheel stably.

The friction resistance generation mechanism includes a plurality of washers disposed axially between the radially inner portions of the input member and the output member. For example, the friction resistance generation mechanism has a friction washer contacting input member, a friction plate engaging with the output member, and an urging member elastically compressed between the output member and the friction plate to urge both members.

As mentioned, the friction generation mechanism includes a friction generation surface on an axial surface of the input member. It is difficult to provide a long radius for the friction generation surface because the elastic member occupies a space in the input member. As a result, there is pressure against each of the members on the friction surface, and thus, the friction washer is quickly worn.

The elastic members are typically coil springs, which have a certain axial length. Therefore, if the elastic members are located in a position where they overlap a friction surface of the second flywheel, the portion of the whole structure becomes too large. In order to solve that problem, a structure is known in which the elastic members are located radially inward of the friction surface of the second flywheel. In that structure, the portion where the axial length is large is not formed. It should be indicated however, that it is impossible to provide a large enough stopper torque by just having one kind of the elastic members.

In view of the above, it will be apparent to those skilled in the art from this disclosure that there exists a need for an improved flywheel assembly. This invention addresses this need in the art as well as other needs, which will become apparent to those skilled in the art from this disclosure.

SUMMARY OF THE INVENTION

It is an object of the present invention to provide a sufficiently large sliding surface for the friction resistance generation mechanism which functions in parallel with the elastic members.

It is another object of the present invention to improve a structure of a flywheel assembly to support an axial load of the second flywheel and to ensure the support is stable.

Still another object of the present invention is to make the flywheel assembly small in the axial direction.

According to a first aspect of the present invention, a flywheel assembly to which a torque is input from a crankshaft of an engine includes a flywheel, a damper mechanism, and a frictional resistance generation mechanism. The damper mechanism elastically connects the flywheel to the crankshaft in the rotational direction. The damper mechanism includes an input member, an output member, and elastic members to connect elastically the input member and the output member in the rotational direction. The frictional resistance generation mechanism is located functionally in parallel with the damper mechanism in the rotational direction. The frictional resistance generation mechanism utilizes a portion of the flywheel as a friction surface.

In this flywheel assembly, a torque from the crankshaft is transmitted to the flywheel through the damper mechanism. When the flywheel rotates relative to the crankshaft due to combustion fluctuations of the engine, the elastic members are compressed between the input member and the output member in the rotational direction and the frictional resistance generation mechanism operates to generate friction. Accordingly, torsional vibrations are quickly dampened. Sliding surface areas are set to be large because the frictional resistance mechanism makes use of a portion of the flywheel as a friction surface. As a result, pressure per area to the sliding surface is low, and thus, the life of the frictional resistance mechanism is prolonged.

A flywheel assembly in accordance with a second aspect of the present invention is the flywheel assembly of the first aspect, wherein it is preferable that the frictional resistance generation mechanism includes a friction member that is rotatable with the input member and contacts the flywheel, and an urging member to urge the friction member against the flywheel. Sliding surface areas are designed to be relatively large because the friction member is urged by the urging member against the flywheel. As a result, pressure per area to the sliding surfaces is relatively low, and thus, the life of the frictional resistance mechanism is prolonged.

A flywheel assembly in accordance with a third aspect of the present invention is the flywheel assembly of the second aspect, wherein it is preferable that a radially inward portion of the friction member and radially outward portions of the elastic members axially overlap, i.e., portions thereof share the same axial position. Further, a radial position of a radially outer edge of the friction member is radially outward that of radially inner edges of the elastic members. It is possible to provide a large friction surface for the frictional resistance mechanism even though the friction member and the elastic members are located very closely in the radial direction because the radially outward portion of the friction member and the radially inward portion of the elastic member axially overlap.

A flywheel assembly in accordance with a fourth aspect of the present invention is the flywheel assembly of the first aspect, wherein it is preferable that the frictional resistance generation mechanism includes a first friction member that is rotatable with the input member and contacts the output member, a second friction member that is rotatable with the input member and contacts the flywheel, and an urging member to urge respectively the first and second friction members against the output member and the flywheel. Sliding surfaces areas are arranged to be large because the second friction member is urged by the urging member against the flywheel. As a result, pressure per area to the sliding surface is low, thus, the life of the frictional resistance mechanism is prolonged.

A flywheel assembly in accordance with a fifth aspect of the present invention is the flywheel assembly of the fourth aspect, wherein it is preferable that radially inward portions of the first and second friction members and radially outward portions of the elastic members axially overlap. Further, a radial position of radially outer edges of the first and second friction members is radially outward that of radially inner edges of the elastic members. It is possible to provide a large friction surface for the frictional resistance mechanism even though the friction member and the elastic members are very closely located in the radial direction because the radially outward portion of the first and second friction members and the radially inward portion of the elastic member axially overlap.

A flywheel assembly in accordance with a sixth aspect of the present invention is the flywheel assembly of the fourth or fifth aspect, wherein it is preferable that only one of the first and second friction members is nonrotatably engaged with the input member, and the first and second friction members are nonrotatably engaged with each other. An engagement structure of the input member is simple because only one of the first and second friction members is nonrotatably engaged with the input member.

A flywheel assembly in accordance with a seventh aspect of the present invention is the flywheel assembly of the first aspect, wherein it is preferable that the input member is a disk plate member and the output member is composed of a pair of disk plates disposed on axially opposite sides of the disk plate member. The frictional resistance generation mechanism includes a first friction member that is rotatable with the input member and contacts the output member, a second friction member rotatable with the input member and contacts the flywheel, and an urging member to urge the first and second friction members against one of the disk plates on the axially opposite side from the flywheel. In the frictional resistance mechanism, the first friction member slides against one of the disk plates, and the second friction member slides against the flywheel. Sliding surface areas are set to be relatively large because the frictional resistance mechanism makes use of a portion of the flywheel as a friction surface. As a result, pressure per area on the sliding surface is low, thus, the life of the frictional resistance mechanism is prolonged.

A flywheel assembly in accordance with an eighth aspect of the present invention is the flywheel assembly of the seventh aspect, wherein it is preferable that radially inward portions of the first and second friction members and radially outward portions of the elastic members axially overlap. Further, a radial position of radially outer edges of the first and second friction members is radially outward that of radially inner edges of the elastic members. It is possible to provide a large friction surface for the frictional resistance mechanism even though the friction member and the elastic members are very closely located in the radial direction, because the radially outward portion of the first and second friction members and the radially inward portion of the elastic member axially overlap.

A flywheel assembly in accordance with a ninth aspect of the present invention is the flywheel assembly of the eighth aspect, wherein it is preferable that the first friction member is nonrotatably engaged with the input member, and the first and second friction members are nonrotatably engaged with each other. An engagement structure of the input member is made simple because only the first friction member is nonrotatably engaged with the input member.

A flywheel assembly in accordance with a tenth aspect of the present invention is the flywheel assembly of the ninth aspect, wherein it is preferable that the first friction member has an annular portion slidably contacting the disk plate member in the rotational direction, and a plurality of engagement portions extending axially from the annular portion and engaging with the input member such that the engagement portions cannot rotate and can move in the axial direction relative to the input member. The second friction member has a plurality of engagement parts engaged with the engagement portions such that the engagement parts and the engagement portions cannot rotate and can move in the axial direction relative to each other. In this flywheel assembly, it easy to arrange the location of the annular portion of the first friction member and the second friction member such that they are separate from each other in the axial direction because the first friction member has a plurality of engagement portions extending in the axial direction.

A flywheel assembly in accordance with an eleventh aspect of the present invention is the flywheel assembly of the tenth aspect, wherein it is preferable that the urging member is located between the second friction member and the engagement portions of the first friction member. A simple structure is realized because the urging member urges the second friction member against the engagement portions of the first friction member.

A flywheel assembly in accordance with a twelfth aspect of the present invention is the flywheel assembly of the eleventh aspect, wherein it is preferable that the frictional resistance generation mechanism further includes a receiving member supported on a tip of the engagement portions of the first friction member to receive an urging force from the urging member. The receiving member can stably bear the urging force from the urging member because the receiving member is supported on the tip of the engagement portions of the first friction member.

A flywheel assembly in accordance with a thirteenth aspect of the present invention is the flywheel assembly of any of the first to twelfth aspects, wherein it is preferable that the frictional resistance generation mechanism generates friction over an entire torsional angle range of the damper mechanism.

A flywheel assembly in accordance with a fourteenth aspect of the present invention is the flywheel assembly of any of the first to thirteenth aspects, wherein it is preferable that the frictional resistance generation mechanism is located radially inward of a radial center of the elastic members of the damper mechanism. Thus, a large amount of space is conserved.

A flywheel assembly in accordance with a fifteenth aspect of the present invention is the flywheel assembly of the fourteenth aspect, wherein it is preferable that the flywheel is formed with a clutch friction surface with which a clutch is frictionally engaged, and the elastic members of the damper mechanism are located radially inward of the clutch friction surface. With this structure, the frictional resistance generation mechanism is unlikely to be affected by heat generated by the clutch, thereby generated friction is stable.

A flywheel assembly in accordance with a sixteenth aspect of the present invention is the flywheel assembly of the fourteenth or fifteenth aspect, wherein it is preferable that the flywheel assembly has a plurality of bolts arranged in the circumferential direction to fix the input member to the crankshaft. Further, the frictional resistance generation mechanism is located radially outward of radially outer edges of the bolts. With this structure, a large amount of space is conserved.

A flywheel assembly in accordance with a seventeenth aspect of the present invention is the flywheel assembly of any of the first to thirteenth aspects, wherein it is preferable that the flywheel is formed with a clutch friction surface with which a clutch is frictionally engaged, and the frictional resistance generation mechanism is located radially inward of the clutch friction surface. With this structure, the frictional resistance generation mechanism is unlikely to be affected by heat generated by the clutch, thus generated friction is stable.

A flywheel assembly in accordance with an eighteenth aspect of the present invention is the flywheel assembly of the seventeenth aspect, wherein it is preferable that the flywheel has a portion including the clutch friction surface and a portion including the friction surface of the frictional resistance generation mechanism.

A flywheel assembly in accordance with a nineteenth aspect of the present invention is the flywheel assembly of the seventeenth aspect, wherein it is preferable that the flywheel has a flywheel main body formed with the clutch friction surface, and a second member formed with the friction surface of the frictional resistance generation mechanism.

A flywheel assembly in accordance with a twentieth aspect of the present invention is the flywheel assembly of the nineteenth aspect, wherein it is preferable that the second member supports the flywheel main body in the radial direction relative to a member on the crankshaft side.

A flywheel assembly in accordance with a twenty-first aspect of the present invention is the flywheel assembly of the nineteenth or twentieth aspect, wherein it is preferable that the second member is rotatable relative to the flywheel main body.

A flywheel assembly in accordance with a twenty-second aspect of the present invention is the flywheel assembly of any of the nineteenth to twenty-first aspects, wherein it is preferable that the second member is an annular plate.

According to a twenty-third aspect of the present invention, a flywheel assembly is provided to receive torque from the crankshaft of the engine. The flywheel assembly has a flywheel, a damper mechanism, and a frictional resistance generation mechanism. The damper mechanism elastically connects the flywheel to the crankshaft in the rotational direction The damper mechanism includes an input member, an output member, and elastic members to connect elastically the input member and the output member in the rotational direction. The frictional resistance generation mechanism is located functionally in parallel with the damper mechanism in the rotational direction. The frictional resistance generation mechanism includes an output rotation member nonrotatably engaged with the output member. Further, the rotation member has a friction surface. The output rotation member is located on an axial side of the output member opposite the crankshaft side.

In this flywheel assembly, a torque from the crankshaft is transmitted to the flywheel through the damper mechanism. When the flywheel rotates relative to the crankshaft due to combustion fluctuations of the engine, the elastic members are compressed between the input member and the output member in the rotational direction and the frictional resistance generation mechanism operates to generate friction. Accordingly, torsional vibrations are quickly dampened. An area of sliding surfaces is arranged to be large because the output rotation member of the frictional resistance mechanism that has the friction surface and the output rotation member is located on the axial side of the output member opposite the crankshaft side. As a result, pressure per area to the sliding surface is relatively low, thus, the life of the frictional resistance mechanism is prolonged.

A flywheel assembly in accordance with a twenty-fourth aspect of the present invention is the flywheel assembly of the twenty-third aspect, wherein it is preferable that the output rotation member is an annular plate member.

According to a twenty-fifth aspect of the present invention, a flywheel assembly is provided to transmit torque from the crankshaft of the engine to the transmission. The flywheel assembly includes a flywheel, elastic members, a disk member, and a thrust bearing. The elastic members elastically connect the flywheel to the crankshaft within a certain angle. The disk member is fixed to the crankshaft to support the elastic members. The thrust bearing is disposed between the disk member and the flywheel in the axial direction to receive an axial load from the flywheel.

In this flywheel assembly, a torque from the crankshaft is transmitted to the flywheel through the damper mechanism. When the flywheel rotates relative to the crankshaft due to combustion fluctuations of the engine, the elastic members are compressed between the input member and the output member in the rotational direction and the frictional resistance generation mechanism operates to generate friction. Accordingly, torsional vibration is quickly dampened. When an axial load is applied to the flywheel toward the engine, the disk plate bears the axial load through the thrust bearing. The thrust load is stably received because the disk plate has a rather flat surface.

A flywheel assembly in accordance with a twenty-sixth aspect of the present invention is the flywheel assembly of the twenty-fifth aspect, wherein it is preferable that the flywheel has a cylindrical portion extending toward the engine in the axial direction at a radially inner edge.

A flywheel assembly in accordance with a twenty-seventh aspect of the present invention is the flywheel assembly of the twenty-fifth or twenty-sixth aspect, wherein it is preferable that a portion of the disk member corresponding to the thrust bearing is in contact with the crankshaft directly or interposes other members with the crankshaft without axial space therebetween. With this structure, the disk member is unlikely to be deformed.

A flywheel assembly in accordance with a twenty-eighth aspect of the present invention is the flywheel assembly of the twenty-sixth or twenty-seventh aspect, wherein it is preferable that the flywheel assembly further includes a cylindrical member fixed to the crankshaft and located radially inward of the cylindrical portion, and a radial bearing disposed between the cylindrical member and the cylindrical portion to receive a radial load from the flywheel.

According to a twenty-ninth aspect of the present invention, a flywheel assembly is provided to transmit torque from the crankshaft of the engine to the transmission through a clutch. The flywheel assembly has a flywheel, a first elastic member, and a second elastic member. The flywheel is formed with an annular friction surface with which the clutch is frictionally engaged. The first elastic member elastically connects the flywheel to the crankshaft within a certain angle, wherein a radial position of the first elastic member is radially inward of the friction surface. The second elastic member is located between the flywheel and the crankshaft to operate functionally in parallel with the first elastic member. The second elastic member is compressed only in the largest area of the compression angle of the first elastic member. A radial position of the second elastic member is within an annular area defined by the friction surface.

In this flywheel assembly, a torque from the crankshaft is transmitted to the flywheel through the damper mechanism. When the flywheel rotates relative to the crankshaft due to combustion fluctuations of the engine, the elastic members are compressed between the input member and the output member in the rotational direction and the frictional resistance generation mechanism operates to generate friction. Accordingly, torsional vibration is quickly dampened. More specifically, only the first elastic member is compressed at the initial stage and then the second elastic member is compressed in parallel with the first elastic member in the largest area of the compression angle of the first elastic damper. The axial size of the flywheel assembly is kept small because the first elastic member is disposed radially inward of the friction surface of the flywheel. With this structure, it is possible to realize a large stopper torque as well as to keep the axial size of the flywheel assembly small because the radial position of the second elastic member is within the annular area of the friction surface.

A flywheel assembly in accordance with a thirtieth aspect of the present invention is the flywheel assembly of the twenty-ninth aspect, wherein it is preferable that a flywheel assembly further includes a first member fixed to the crankshaft to support the first and second elastic members, and a second member fixed to the flywheel to support the first and second elastic members. Portions of the first member and the second member constitute a stopper to abut with each other when the torsional angle of the first and second elastic members becomes large. When the first member rotates relative to the second member, the first and second elastic members are compressed in the circumferential direction, and the portions of the first and second members eventually abut with each other to stop the relative rotation.

A flywheel assembly in accordance with a thirty-first aspect of the present invention is the flywheel assembly of the thirtieth aspect, wherein it is preferable that a radial position of the stopper is within the annular area defined by the friction surface. With this structure, the radial size of the flywheel assembly is kept small.

A flywheel assembly in accordance with a thirty-second aspect of the present invention is the flywheel assembly of the thirty-first aspect, wherein it is preferable that a radial position of the stopper is the same as that of the second elastic member. With this structure, the radial size of the flywheel assembly is kept small.

A flywheel assembly in accordance with a thirty-third aspect of the present invention is the flywheel assembly of the thirty-second aspect, wherein it is preferable that the first member is a disk member formed with a plurality of partitions arranged in the circumferential direction. The second elastic member and a part of the second member are located in spaces between the partitions, the second elastic member and the part are located in different spaces. The partitions and the part of the second member constitute the stopper. The partitions have the function of abutting with the second elastic member and abutting with the part of the second member in the circumferential direction.

A flywheel assembly in accordance with a thirty-fourth aspect of the present invention is the flywheel assembly of any of the twenty-ninth to thirty-third aspects, wherein it is preferable that the first and second elastic members are coil springs, and the coil diameter of the second elastic member is smaller than that of the first elastic member. With this structure, the axial length of the flywheel assembly where the second elastic member is located is kept small.

A flywheel assembly in accordance with a thirty-fifth aspect of the present invention is the flywheel assembly of the thirty-fourth aspect, wherein it is preferable that the coil diameter of the second elastic member is 0.3 to 0.7 times than that of the first elastic member.

A flywheel assembly in accordance with a thirty-sixth aspect of the present invention is the flywheel assembly of any of the twenty-ninth to thirty-fifth aspects, wherein it is preferable that torsional rigidity of the second elastic member is higher than that of the first elastic member.

A flywheel assembly in accordance with a thirty-seventh aspect of the present invention is the flywheel assembly of the thirty-sixth aspect, wherein it is preferable that torsional rigidity of the second elastic member is two times or more than that of the first elastic member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. First Embodiment (1) Structure

1) Overall Structure

Figure 1:
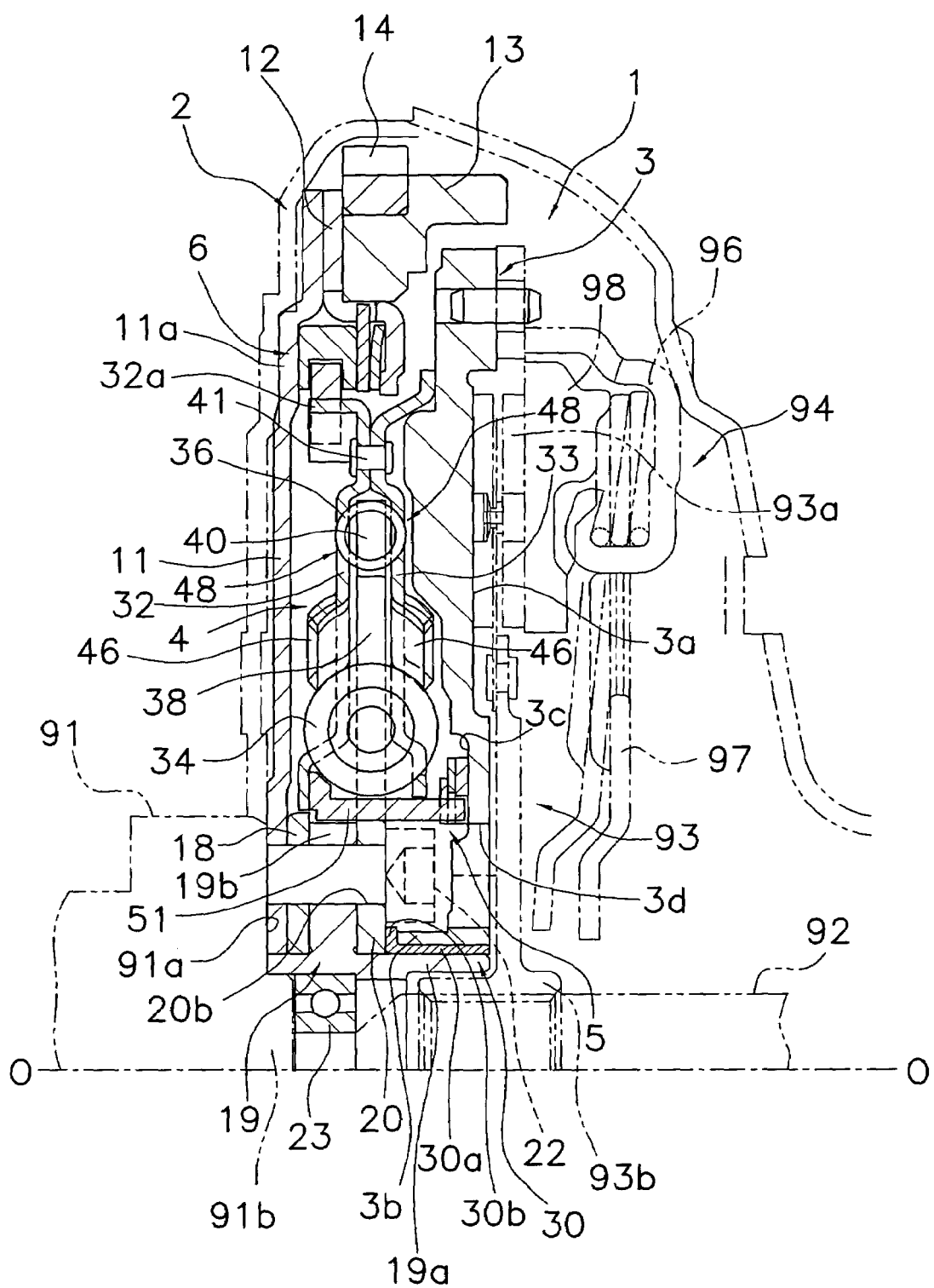
FIG. 1 is a schematic cross-sectional view of a dual-mass flywheel in accordance with a first preferred embodiment of the present invention.
Figure 2:
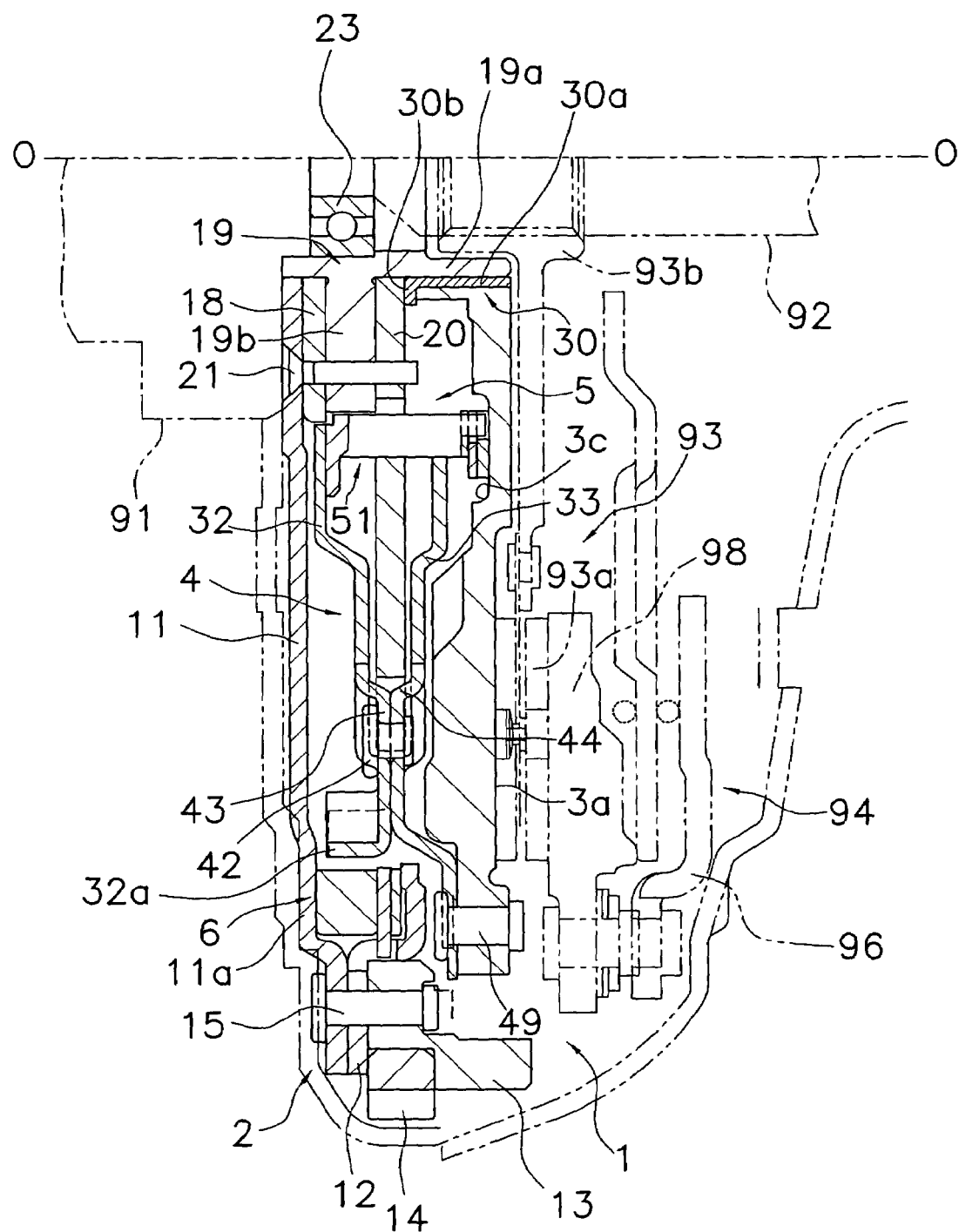
FIG. 2 is an alternate schematic cross-sectional view of the dual-mass flywheel.

As seen in FIGS. 1 and 2, a dual-mass flywheel or flywheel damper 1 in accordance with a first preferred embodiment of the present invention is provided to transmit torque from a crankshaft 91 on an engine side to an input shaft 92 on an transmission side by way of a clutch including a clutch disk assembly 93 and a clutch cover assembly 94. The dual-mass flywheel 1 has a damper function to absorb and to attenuate torsional vibrations. The dual-mass flywheel 1 is mainly made of a first flywheel 2, a second flywheel 3, a damper mechanism 4, a first friction generation mechanism 5, and a second friction generation mechanism 6.

Figure 3:
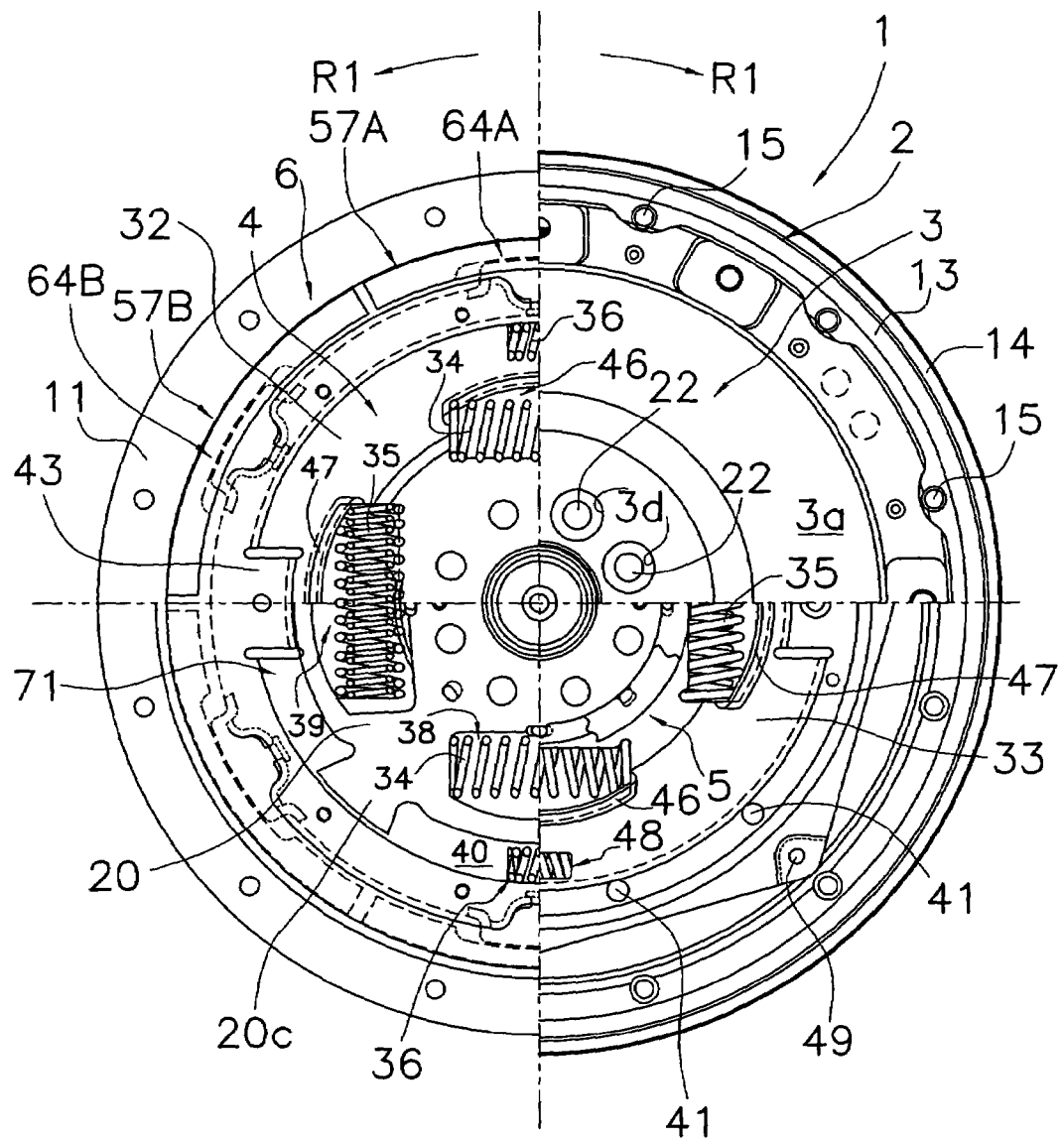
FIG. 3 is an elevational view of the flywheel dual-mass with sections removed for illustrative purposes.

In FIGS. 1 and 2, O-O indicates a rotation axis of the dual-mass flywheel 1 and the clutch. An engine (not shown) is disposed on the left side in FIGS. 1 and 2, and a transmission (not shown) is disposed on the right side. In the following description, the left side in FIGS. 1 and 2 will be referred to as the engine side, which is based on the axial direction, and the right side will be referred to the transmission side, which is also based on the axial direction. In FIG. 3, an arrow R1 indicates a drive side, i.e., forward side in the rotational direction, and an arrow R2 indicates a reverse drive side (rearward side in the rotational direction). The numerical values in the following embodiments are shown as examples and do not limit the present invention.

2) First Flywheel

The first flywheel 2 is fixed to the tip of the crankshaft 91. The first flywheel 2 ensures a large moment of inertia on the crankshaft side. The first flywheel 2 principally includes a flexible plate 11 and an inertia member 13.

The flexible plate 11 is provided to absorb bending vibrations from the crankshaft 91 as well as to transmit torque from the crankshaft 91 to the inertia member 13. Accordingly, the flexible plate 11 has a high rigidity in the rotational direction but a relatively low rigidity in the axial and bending directions. Specifically, the axial rigidity of the flexible plate 11 is equal to or below 3000 kg/mm, preferably in the range between 600 kg/mm and 2200 kg/mm. The flexible plate 11 is a disk-like plate having a central hole and preferably made of a metal plate, for example. The radially inner end of the flexible plate 11 is fixed to the tip of the crankshaft 91 by a plurality of bolts 22. Bolt through-holes are formed in the flexible plate 11 in positions corresponding to the bolts 22. The bolts 22 are mounted on the crankshaft 91 from the axial-direction transmission side.

The inertia member 13 has a thick block shape when viewed cross-sectionally, and is fixed to the axial-direction transmission side on the radially outer edge of the flexible plate 11. The radially outer portion of the flexible plate 11 is fixed to the inertia member 13 by a plurality of circumferentially aligned rivets 15. A ring gear 14 that is provided to facilitate engine startup is fixed to the outer circumferential surface of the inertia member 13. The first flywheel 2 may also be constructed as an integral member.

3) Second Flywheel

The second flywheel 3 is an annular disk-like member, and is disposed on the axial-direction transmission side of the first flywheel 2. The second flywheel 3 has a friction surface 3a formed on the axial-direction transmission side. The friction surface 3a is an annular, flat surface. Further, the friction surface 3a is a portion that engages a clutch disk assembly 93 described hereinafter. The second flywheel 3 has an inner cylindrical portion 3b extending toward the engine in the axial direction from the inner circumferential edge of the second flywheel 3. A radially inner portion of the second flywheel 3 is formed with a plurality of through holes 3d aligned in the circumferential direction with the bolts 22, such that the bolts 22 can pass therethrough.

4) Damper Mechanism

The damper mechanism 4 is described below. The damper mechanism 4 elastically engages the second flywheel 3 and the crankshaft 91 in the rotational direction. Therefore, the second flywheel 3 with the damper mechanism 4 constitutes a flywheel assembly or a flywheel damper because the second flywheel 3 is connected to the crankshaft 91 by way of the damper mechanism 4. As shown in FIGS. 1, 2, and 3, the damper mechanism 4 is composed of a plurality of coil springs (elastic members) 34, 35, and 36, a pair of output disk-like plates (output member) 32 and 33, and an input disk-like plate (input member) 20. As shown in the mechanical circuit of FIG. 15, the coil springs 34, 35, and 36 are located functionally in parallel with the first and second friction generation mechanism 5 and 6 in the rotational direction.

Referring now to FIGS. 1, 2, and 3, the pair of output disk-like plates 32 and 33 is composed of a first plate 32 on the axial-direction engine side, and a second plate 33 on the axial-direction transmission side. Both plates 32 and 33 are disk-like members, and are disposed with a certain distance therebetween in the axial direction. A plurality of window portions 46 and 47 aligned in the circumferential direction are formed in each of the plates 32 and 33. The window portions 46 and 47 are structures that support the coil springs 34 and 35 (described hereinafter) in the axial and rotational directions, hold the coil springs 34 and 35 in the axial direction, and have upwardly cut portions that make contact at both ends in the circumferential direction thereof. As seen in FIG. 3, the number of the window portions 46 and 47 is preferably and respectively two for a total of four. The window portions 46 and 47 are aligned alternately in the circumferential direction in the same radial position. Furthermore, the plates 32 and 33 are formed with a plurality of third window portions 48 aligned in the circumferential direction. The number of the third window portions 48 is preferably two. The third window portions 48 are opposed to each other in a radial direction. Specifically, the third window portions 48 are formed radially outward of the first window portions 46 and support the third coil springs 36 described hereinafter in the axial and rotational direction.

As seen in FIGS. 1 and 2, the first plate 32 and the second plate 33 maintain a distance in the axial direction at the radially inner portions, but are in contact with each other at the radially outer portions and fixed to each other by rivets 41 and 42. As seen in FIG. 3, the first rivets 41 are aligned in the circumferential direction. As seen in FIG. 2, the second rivets 42 are respectively disposed at cut and raised contact portions 43 and 44 of the first plate 32 and the second plate 33. As shown in FIGS. 2 and 3, the contact portions 43 and 44 are formed in two positions diametrically opposing each other. Specifically, the contact portions 43 and 44 are formed radially outward of the second window portion 47. The axial position of the contact portions 43 and 44 is the same as that of the input disk-like plate 20. Further, the second plate 33 is fixed to the second flywheel 3 through rivets 49 at each of the radially outer portions.

Figure 9:
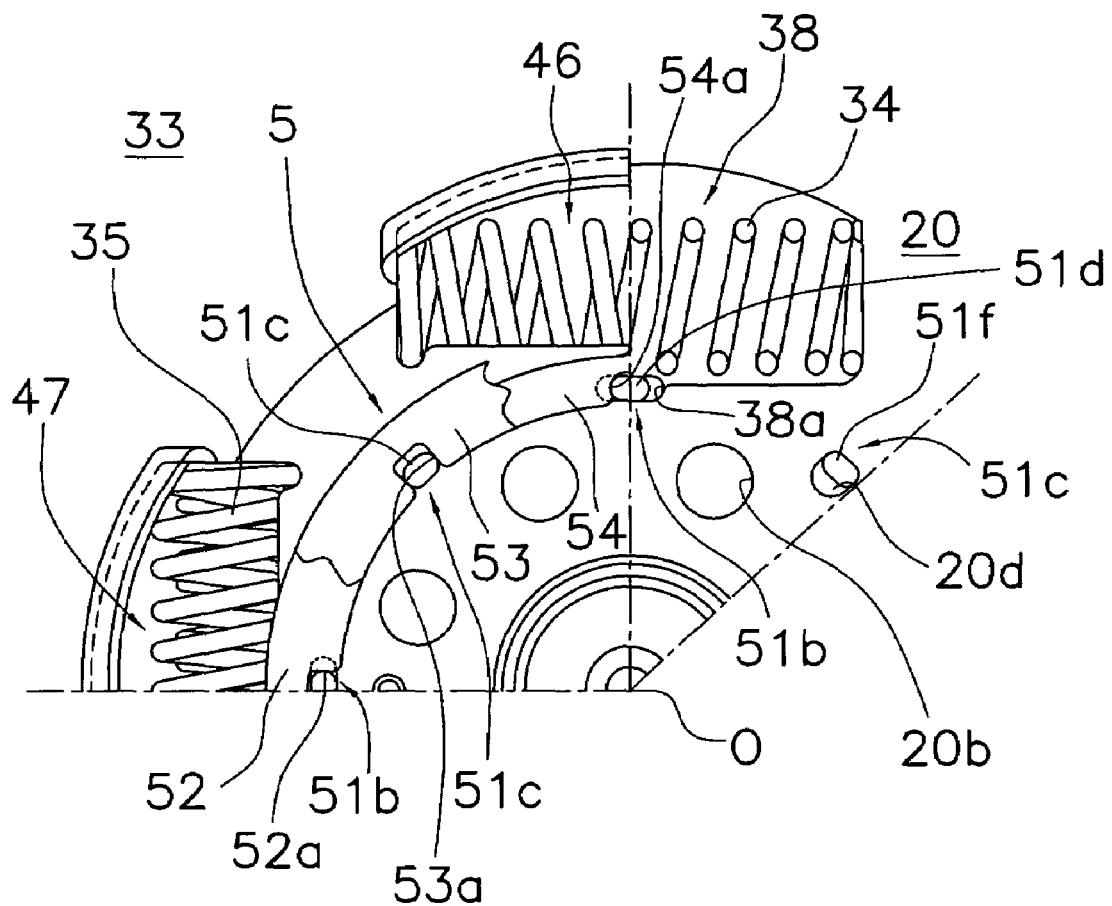
FIG. 9 is an enlarged elevational view of the first friction generation mechanism.
Figure 11:
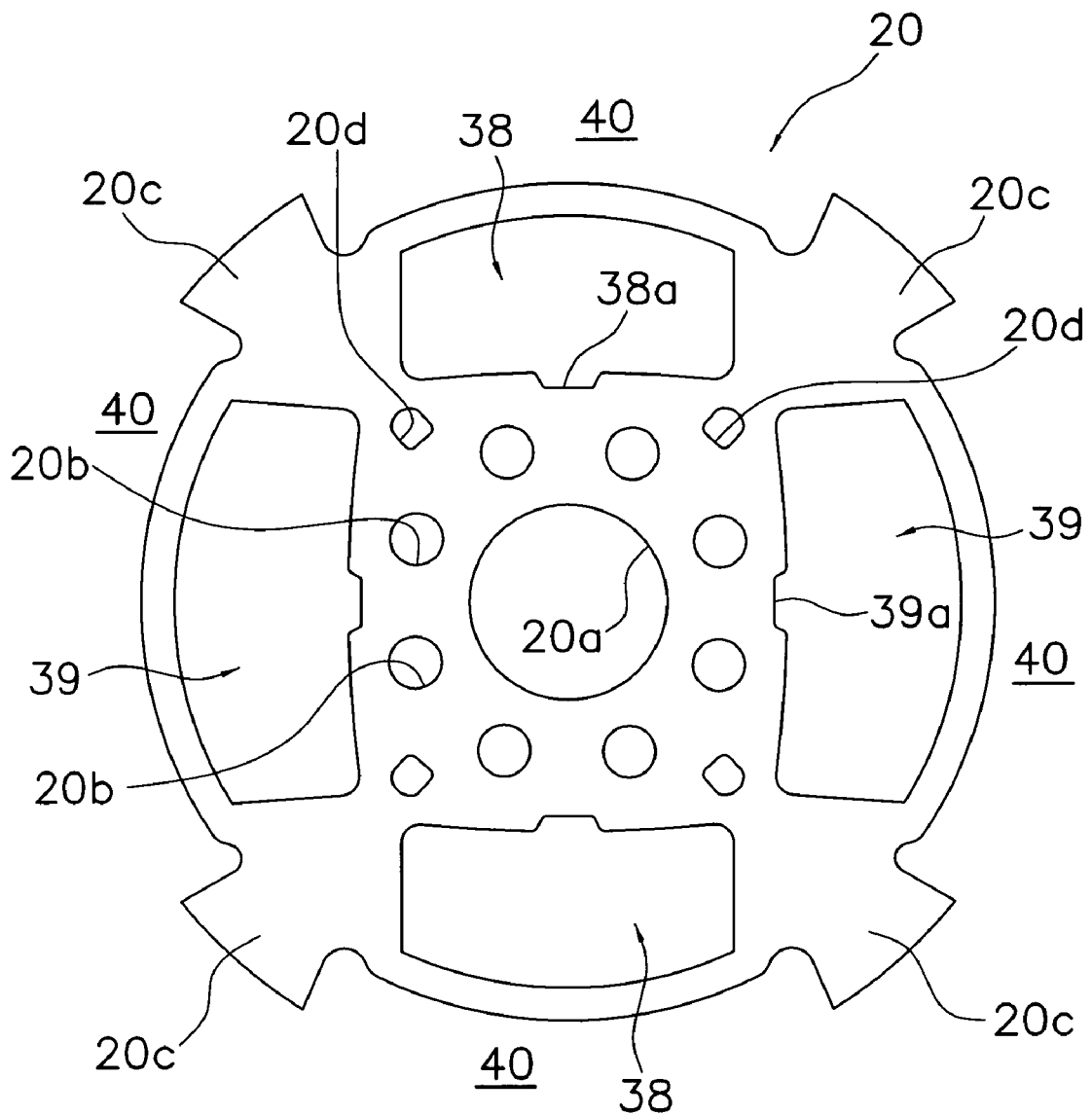
FIG. 11 is an elevational view of an input disk-like plate of a damper mechanism of the dual-mass flywheel.

Referring now to FIGS. 1, 2, and 11, the input disk-like plate 20 is a disk-like member disposed between the plates 32 and 33. The input disk-like plate 20 has a plurality of first window holes 38 corresponding to the window portions 46, and second window holes 39 corresponding to the first window portions 47. As seen in FIGS. 3 and 11, the first and second window holes 38 and 39 have a straight or slightly curved radially inner edge having a recess 38a and 39a extending radially inward at the circumferentially middle portion. The input disk-like plate 20 is formed with a central hole 20a and a plurality of through holes 20b for bolts to be inserted around the central hole 20a. The input disk-like plate 20 has a plurality of protrusions 20c extending radially outward from the radially outer edge at the locations circumferentially between the window holes 38 and 39. The protrusions 20c are positioned circumferentially apart from the contact portions 43 and 44 of the output disk-like plates 32 and 33 and the third coil springs 36 such that the protrusion 20c can collide with either of them in the circumferential direction. In other words, the protrusions 20c and the contact portions 43 and 44 constitute a stopper mechanism 71 of the damper mechanism 4. Furthermore, spaces between the protrusions 20c in the circumferential direction function as third window holes 40 to accommodate the third coil springs 36. Referring to FIGS. 9 and 11, in addition, the input disk-like plate 20 is formed with a plurality of holes 20d. The number of holes 20d is preferably four. Each hole 20d has a circular portion at its radial outermost section. The rotational positions of the holes 20d are between the window holes 38 and 39 in the circumferential direction, and the radial position of the holes 20d are the same as or close to those of the recesses 38a Referring again to FIGS. 3 and 11, as mentioned above, the protrusions 20c of the input disk-like plate 20 function as partitions maintaining space therebetween in the circumferential direction. Between each of protrusions 20c, the third spring 36 or the contact portion 43 and 44 is disposed. In other words, the protrusions 20c have a function of abutting with the third coil springs 36 in the rotational direction and a function of abutting with the contact portions 43 and 44 of the disk-like plates 32 and 33 in the rotational direction.

Referring again to FIGS. 1 and 2, the input disk-like plate 20 is fixed to the crankshaft 91 together with the flexible plate 11, a reinforcement member 18, and a support member 19. The radially inner portion of the flexible plate 11 is in contact with an axially transmission side surface of a tip surface 91a of the crankshaft 91. The reinforcement member 18 is a disk-like member and is in contact with an axially transmission side surface of the radially inner portion of the flexible plate 11.

The support member 19 is composed of a disk-like portion 19b and a cylindrical portion 19a that extends to the axial-direction transmission side from the radially outer edge. The disk-like portion 19b is in contact with an axially transmission side surface of the reinforcement member 18. The disk-like portion 19b is formed with through holes for the bolts 22 and is fixed to the crankshaft 91. The disk-like portion 19b is an annular flat portion and the cylindrical portion 19a extends toward the transmission in the axial direction from a radially inner edge. The inner circumferential surface of the cylindrical portion 19a is in contact with the outer circumferential surface of a cylindrical projection 91b formed at the center of the tip of the crankshaft 91 so that the support member 19 is centered in the radial direction. The inner circumferential surface of the input disk-like plate 20 is in contact with the outer circumferential surface of a cylindrical portion 19a at an axially transmission side portion so that the input disk-like plate 20 is centered in the radial direction. A bearing 23 is attached to the inner circumferential surface of the cylindrical portion 19a to support the tip of the input shaft 92 of the transmission. In addition, the members 11, 18, 19, and 20 are fastened to each other by screws 21.

As described above, the support member 19 is fixed to the crankshaft 91 such that the support member 19 is centered relative to the crankshaft 91. Further, the support member 19 centers the first flywheel 2 and the second flywheel 3 in the radial direction. That is, the one member has a plurality of functions so that the number of the components is reduced along with manufacturing costs.

The inner circumferential surface of the cylindrical portion 3b of the second flywheel 3 is supported by an outer circumferential surface of the cylindrical portion 19a of the support member 19 through a bush 30. As described above, the second flywheel 3 is supported and centered by the support member 19 relative to the first flywheel 2 and the crankshaft 91. The bush 30 further has a radial bearing portion 30a already described and a thrust bearing portion 30b disposed between the radially inner portion of the input disk-like plate 20 and a tip of the cylindrical portion 3b of the second flywheel 3. As a result, a thrust load from the second flywheel 3 is received by the members 11, 18, 19, and 20, which are aligned in the axial direction through the thrust bearing portion 30b. In other words, the thrust bearing portion 30b of the bush 30 functions as a thrust bearing supported by the radially inner portion of the input disk-like plate 20 for an axial load from the second flywheel 3. The load generated at the thrust bearing portion 30b is stable because the radially inner portion of the input disk-like plate 20 is flat and the flatness is improved. Furthermore, the length of the thrust bearing portion 30b is long enough to stabilize hysteresis torque because the radially inner portion of the input disk-like plate 20 is flat. Furthermore, the radially inner portion of the input disk-like plate 20 is unlikely to be deformed since it is in direct contact with the disk-like portion 19b of the support member 19 such that there is no space in the axial direction.

The radial bearing portion 30a and the thrust bearing portion 30b may be separate members. In addition, the input disk-like plate 20 may directly contact the tip surface of the crankshaft 91.

The first coil spring 34 is disposed in the first window holes 38 and the first window portions 46. Rotational ends of the first coil spring 34 are in contact with or close to rotational end surfaces of the first window holes 38 and the first window portion 46.

As shown in FIG. 3, the second coil springs 35 are disposed in the second window holes 39 and the second window portions 47. The second coil spring 35 is made of a large and a small spring. Thus, the second coil spring 35 has a higher rigidity than the first coil spring 34. Rotational ends of the second coil spring 35 are in contact with or close to rotational end surfaces of the second window portion 47 but are separated in the circumferential direction from rotational end surfaces of the second window hole 39 by a certain angle, which is preferably four degrees in this embodiment. Referring now to FIGS. 1 and 3, the first coil springs 34 and the second coil springs 35 are aligned in the circumferential direction, wherein the radial positions are the same. The first coil springs 34 and the second coil springs 35 are disposed radially inward of a portion of the clutch friction surface 3a against which the friction facing 93a is pressed, i.e., the springs 34 and 35 do not have any portion which is positioned radially outward of the inner circumferential edge of the clutch engagement portion. Accordingly, the axial dimension of the flywheel assembly is reduced because the first and second coil springs 34 and 35 are located radially inward of the clutch friction surface 3a of the second flywheel 3.

The third coil springs 36 are disposed in the third window holes 40 and the third window portions 48. The third coil springs 36 are smaller than the second and third coil springs 34 and 35. Further, the rigidity of the third coil springs 36 is higher than that of the first and second coil springs 34 and 35, and preferably at least twice as rigid. The third coil springs 36 are functionally disposed between the second flywheel 3 and the crankshaft 91 are functionally disposed in parallel with the first and second coil springs 34 and 35 in the rotational direction. The radial position of the third coil springs 36 is within an annular area defined by the friction surface 3a.

5) Friction Generation Mechanism 5-1) First Friction Generation Mechanism

The first friction generation mechanism 5 operates between the input disk-like plate 20 and the output disk-like plate 32 and 33 of the damper mechanism 4 in parallel with the coil springs 34, 35, and 36 in the rotational direction. The first friction generation mechanism 5 generates a certain frictional resistance (hysteresis torque) when the second flywheel 3 rotates relative to the crankshaft 91. The first generation mechanism 5 generates friction over the entire torsional angle region and is not excessively high.

Figure 7:
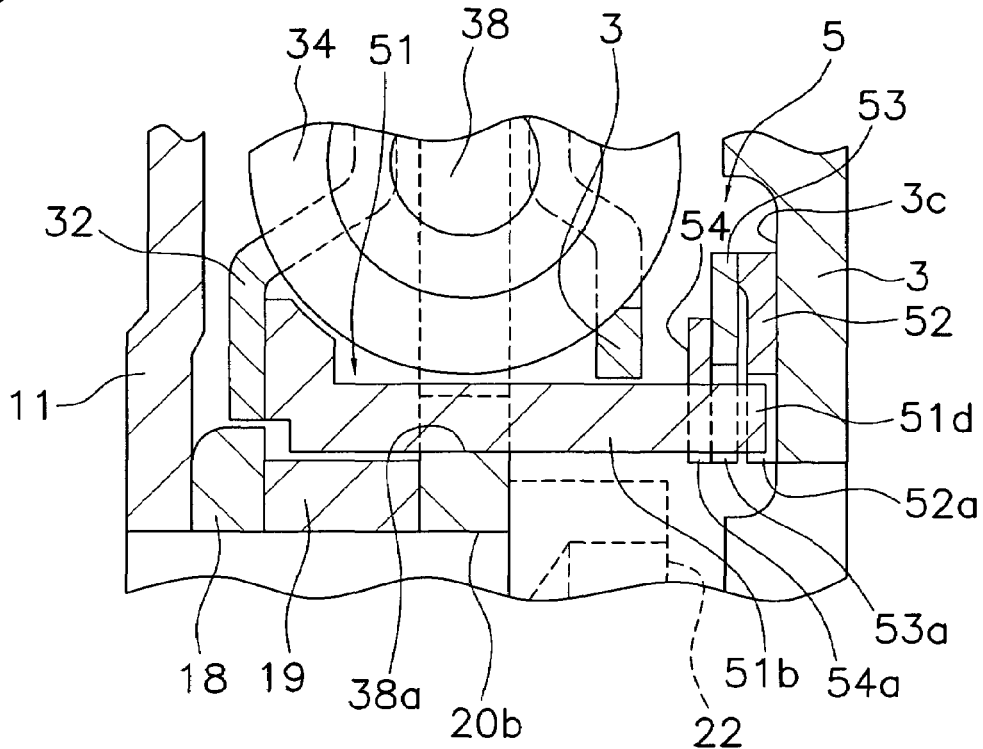
FIG. 7 is an enlarged cross-sectional view of a first friction generation mechanism of the dual-mass flywheel.
Figure 8:
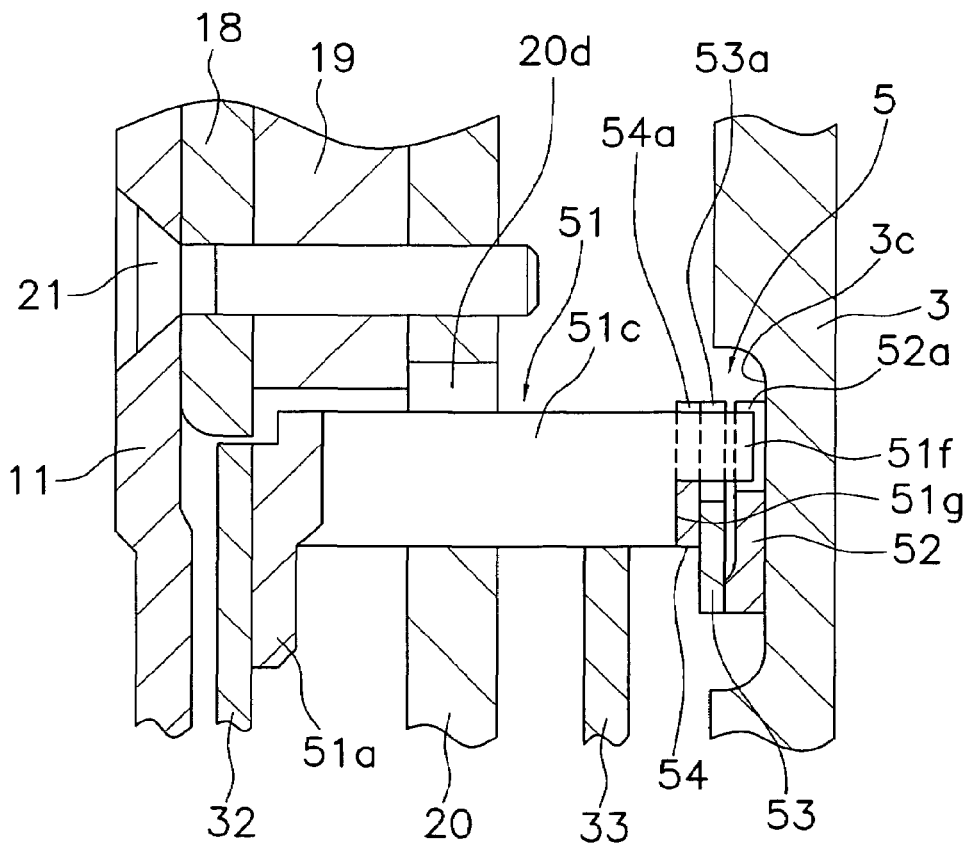
FIG. 8 is an alternate enlarged cross-sectional view of the first friction generation mechanism.

The first friction generation mechanism 5 is disposed radially inward of the damper mechanism 4 and axially between the first plate 32 and the second flywheel 3. As seen in FIGS. 1, 7, and 8, the first friction generation mechanism 5 is composed of a first friction member 51, a second friction member 52, a cone spring (urging member) 53, and a washer 54.

The first friction member 51 rotates together with the input disk-like plate 20 to slide against the first plate 32 in the rotational direction. As shown in FIGS. 7-10, the first friction member 51 has an annular portion 51a, and first and second engagement portions 51b and 51c extending from the annular portion 51a. The annular portion 51a contacts the radially inner portion of the first plate 32 to slide in the rotational direction. The first engagement portions 51b and the second engagement portions 51c are located alternately in the circumferential direction. The first engagement portion 51b has a shape extending in the circumferential direction with a narrow width in the radial direction. In other words, the first engagement portion 51b is slot-shaped. The first engagement portion 51b is engaged with the recesses 38a and 39a of the window holes 38 and 39 of the input disk-like plate 20. The second engagement portion 51c has a shape extending in the rotational direction but not to the extent of the first engagement portion 51b. The second engagement portion 51c is engaged with the hole 20d of the input disk-like plate 20. Accordingly, the first friction member 51 can move relative to the input disk-like plate 20 in the axial direction, but not in the rotational direction.

A first protrusion 51d is formed at the circumferentially middle position of the tip of the first engagement portion 51b and extends in the axial direction from the first engagement portion 51b. A pair of first axial end surfaces 51e is formed on the circumferential sides of the first protrusion 51d. Furthermore, a second protrusion 51f is formed at the radially inward portion of the tip of the second engagement portion 51c. A first axial end surface 51g is formed radially outward of the second protrusion 51f.

The second friction member 52 rotates together with the input disk-like plate 20 to slide against the second flywheel 3 in the rotational direction. As shown in FIGS. 7, 8, 9, and 14, the second friction member 52 is an annular member and contacts a second friction surface 3c, which is in the radially inner portion of the second flywheel 3. The second friction surface 3c is a concave portion that extends toward the transmission in the axial direction further than any other portion of the first friction generating mechanism 5 on the engine side of the second flywheel 3, and is an annular flat surface.

The second friction member 52 is formed with a plurality of recesses 52a aligned in the circumferential direction at the inner circumferential edge. The first protrusion 51d of the first engagement portion 51b and the second protrusion 51f of the second engagement portion 51c are respectively engaged with the recesses 52a. Accordingly, the second friction member 52 can move relative to the first friction member 51 in the axial direction, but not in the rotational direction.

Figure 13:
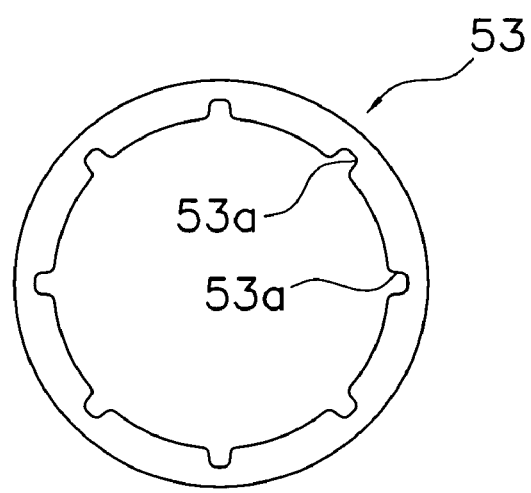
FIG. 13 is an elevational view of a cone spring of the first friction generation mechanism.
Figure 14:
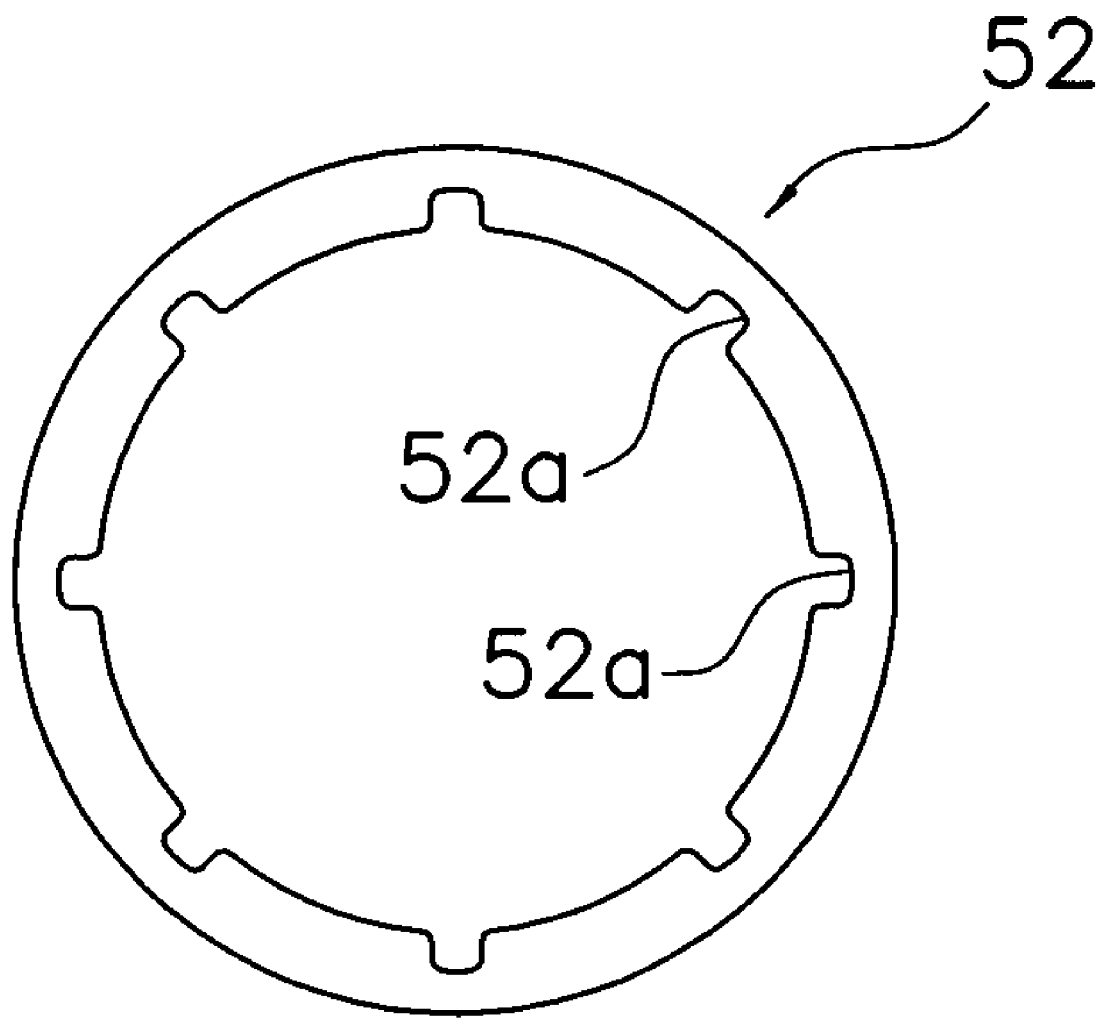
FIG. 14 is an elevational view of a second friction washer of the first friction generation mechanism.

The cone spring 53 is disposed axially between the first friction member 51 and the second friction member 52 and urges each of the members in axially opposite directions. As shown in FIG. 13, the cone spring 53 is a conical or disk-like member formed with a plurality of recesses 53a at the inner circumferential edge. Referring now to FIGS. 7 to 10, the first protrusion 51d of the first engagement portion 51b and the second protrusion 51f of the second engagement portion 51c are respectively engaged with the recesses 53a. Accordingly, the cone spring 53 can move relative to the first friction member 51 in the axial direction, but not in the rotational direction.

Figure 12:
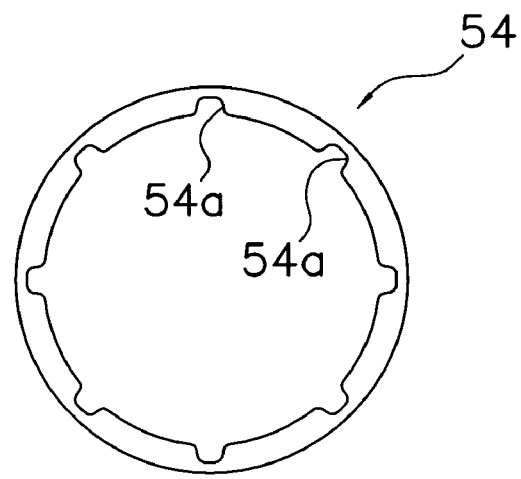
FIG. 12 is an elevational view of a washer of the first friction generation mechanism.

The washer 54 is provided to ensure or to stabilize the transfer of a load of the cone spring 53 to the first friction member 51. As shown in FIG. 12, the washer 54 is an annular member and is formed with a plurality of recesses 54a aligned in the circumferential direction at the radially inner edge. Referring now to FIGS. 7, 8, and 9, the first protrusion 51d of the first engagement portion 51b and the second protrusion 51f of the second engagement portion 51c are respectively engaged with the recesses 54a. Accordingly, the washer 54 can move relative to the first friction member 51 in the axial direction, but not in the rotational direction. Referring now to FIGS. 7 and 8, the washer 54 is received on the first axial end surface 51e of the first engagement portion 51b and the second axial end surface 51g of the second engagement portion 51c. The radially inner portion of the cone spring 53 is supported by the washer 54 and the radially outer portion of the cone spring 53 is supported by the second friction member 52.

5-2) Second Friction Generation Mechanism

Referring now to FIGS. 1, 2, 4, and 5, the second friction generation mechanism 6 operates between the input disk-like plate 20 and the output disk-like plate 32 and 33 of the damper mechanism 4 in parallel with the coil springs 34, 35, and 36. The second friction generation mechanism 6 generates a relatively large frictional resistance (hysteresis torque) over the whole range of the torsional characteristics when the second flywheel 3 rotates relative to the crankshaft 91. In this embodiment, the hysteresis torque generated by the second friction generation mechanism 6 is preferably from five to ten times that generated by the first friction generation mechanism 5.

The second friction generation mechanism 6 is made of a plurality of washers contacting with each other disposed in an axial space between an annular portion 11a at the radially outer portion of the flexible plate 11 and a second disk-like plate 12 disposed axially between the flexible plate 11 and the inertia member 13. The washers of the second friction generation mechanism 6 are disposed adjacent to a radially inward side of the inertia member 13 and the rivets 15.

Figure 4:
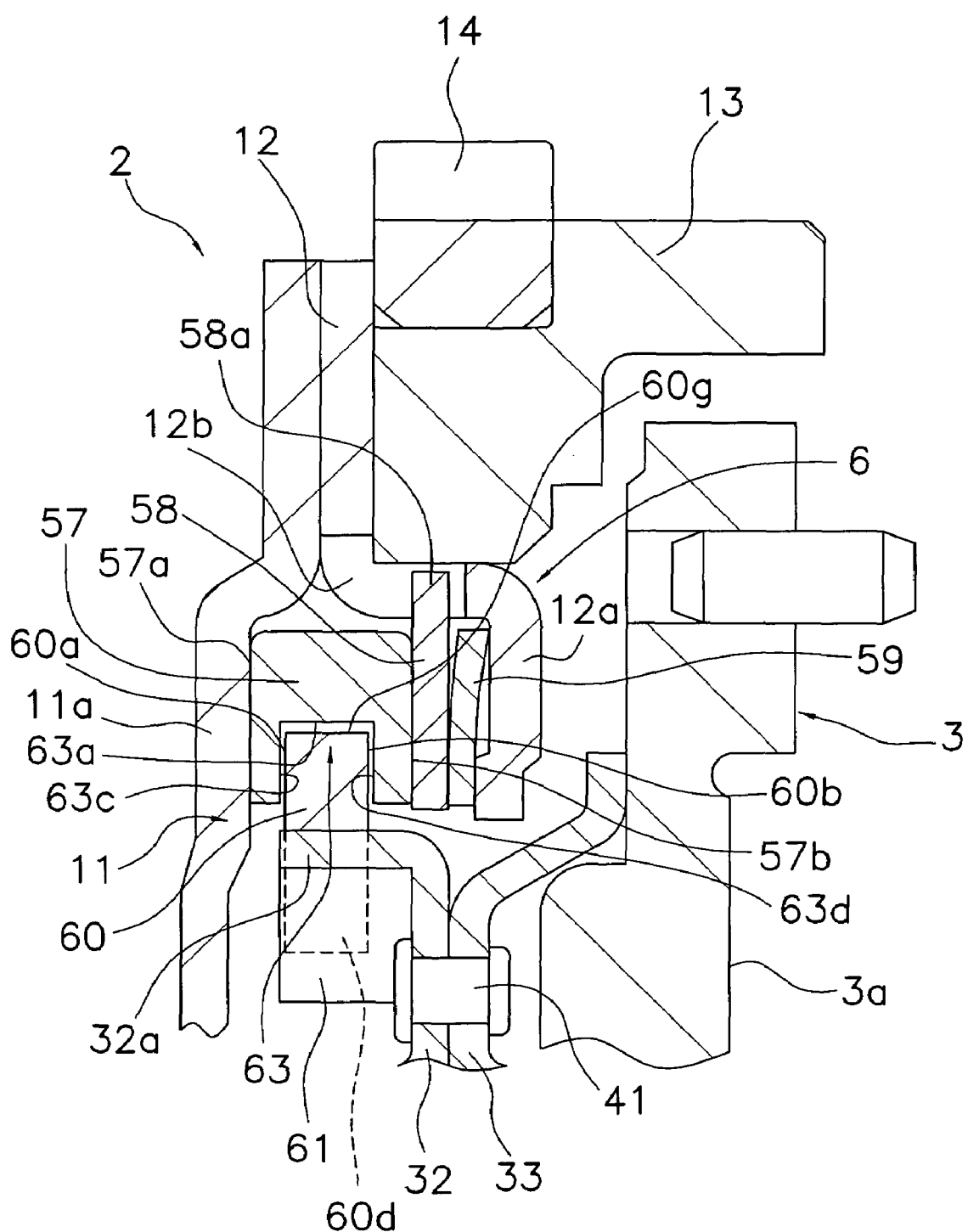
FIG. 4 is an enlarged fragmentary cross-sectional view that particularly illustrates a second friction resistance generating mechanism of the dual-mass flywheel.

As seen in FIG. 4, the second friction generation mechanism 6 has, in order in an axial direction from the flexible plate 11 toward the opposing portion 12a of the second disk-like plate 12, friction washers 57, an input friction plate 58, and a cone spring 59. Thus, the flexible plate 11 has a function that accommodates the second friction generation mechanism 6 so that the number of components is reduced and the structure simplified.

The cone spring 59 imparts a load in the axial direction to friction surfaces. Further, the cone spring 59 is interposed and compressed between the opposing portion 12a and the input friction plate 58, and therefore exerts an urging force on both members in the axial direction. Pawls 58a formed on the radially outer edge of the input friction plate 58 are engaged with axially extending cutaway areas 12b of the second disk-like plate 12. Thus, the input friction plate 58 is prevented from rotating relative to the second disk-like plate 12 by this engagement, but is movable in the axial direction.

Figure 5:
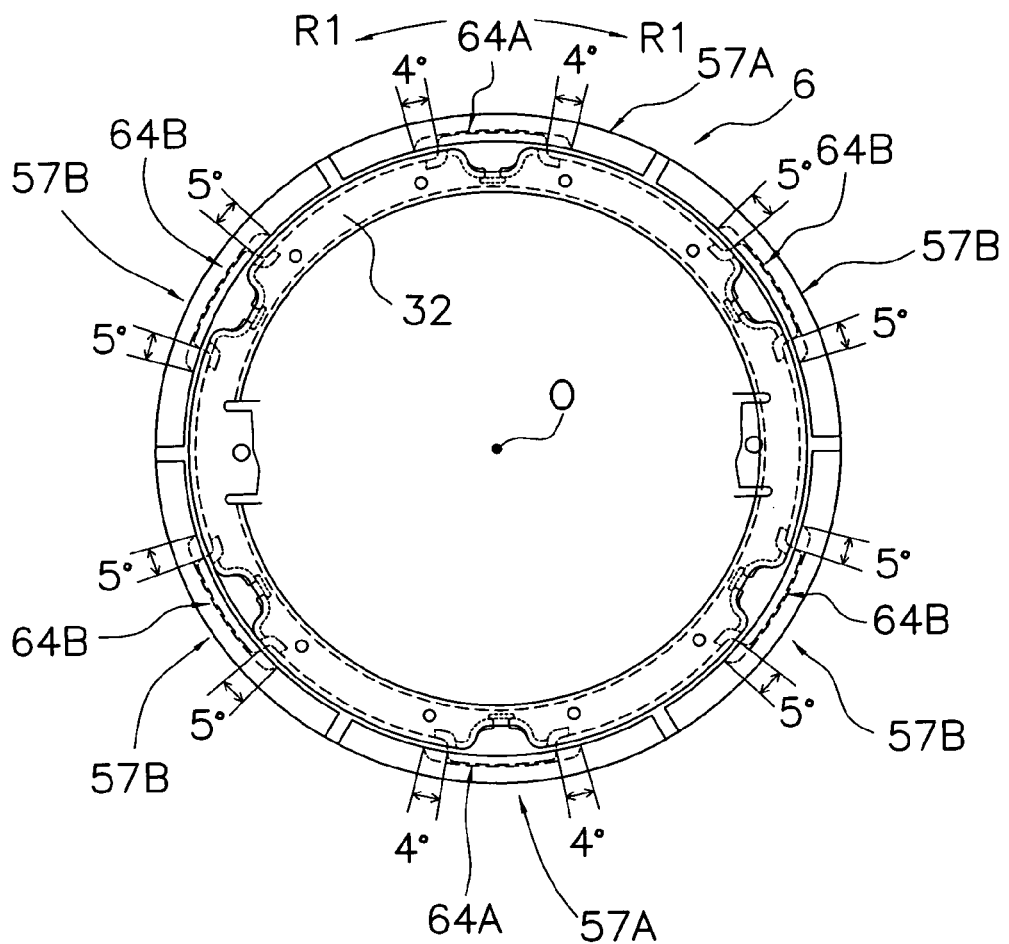
FIG. 5 is an elevational view of the second friction generation mechanism.
Figure 6:
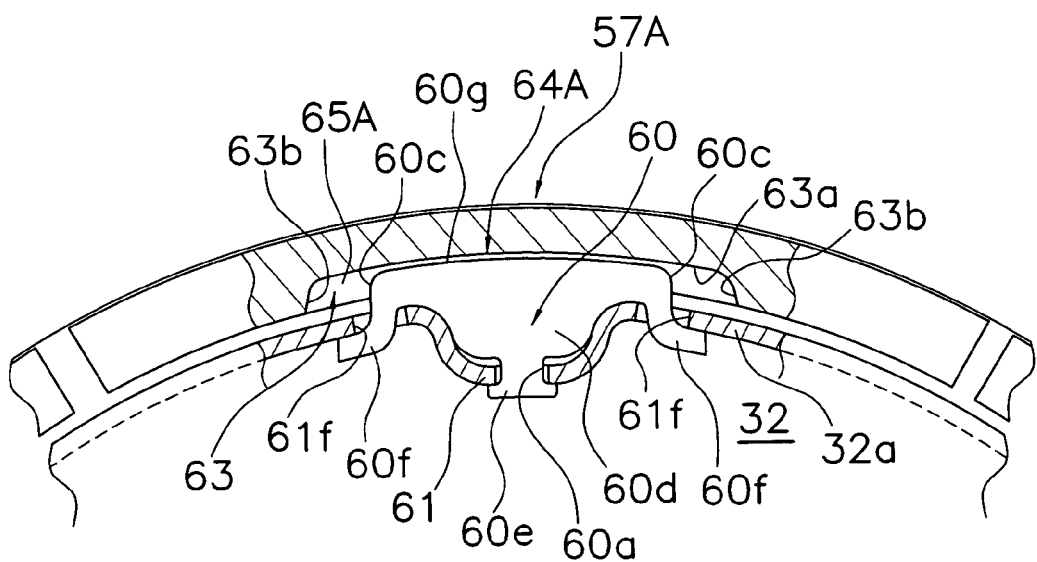
FIG. 6 is an enlarged elevational view of the second friction generation mechanism of FIG. 5 with sections removed for illustrative purposes.

As seen in FIG. 5, the friction washers 57 are composed of a plurality of members. The members are aligned and disposed in the direction of rotation, and each of these extends in the form of an arc. In this embodiment, there are preferably a total of six friction washers 57. Referring again to FIG. 4, the friction washers 57 are interposed between the input friction plate 58 and the annular portion 11a of the flexible plate 11. In other words, the axial-direction engine side surface 57a of the friction washers 57 makes contact in a slidable manner with the axial-direction transmission side surface of the flexible plate 11, and the axial-direction transmission side surface 57b of the friction washers 57 makes contact in a slidable manner with the axial-direction engine side surface of the input friction plate 58. Referring now to FIGS. 4 and 6, concavities 63 are axially and rotationally formed in the inner circumferential surface of the friction washers 57. The concavities 63 are formed roughly in the center of the direction of rotation of the friction washers 57, and more specifically, have a bottom surface 63a extending in the direction of rotation, and rotational direction end faces 63b extending from both ends thereof in a roughly radial direction (roughly at a right angle from the bottom surface 63a). In other words, the concavities open toward the axis of rotation O-O, with the bottom surface 63a being arranged radially outward of its opening, and the rotational direction end faces 63b extending radially inward from the bottom surface 63a. The concavity 63 is formed in the axially middle portion of the inner circumferential surface of the friction washer 57 so that the concavity 63 has axial end faces 63c and 63d forming axial side surfaces.

A plurality of friction engagement members 60 is disposed to correspond to the concavities 63 of the friction washers 57. More specifically, the friction engagement members 60 are disposed radially inward of the friction washers 57 and within the concavities 63. The radially outer portion of the friction engagement member 60 is within the concavity 63. Both the friction washers 57 and friction engagement members 60 are preferably made of resin.

A friction engagement portion 64 including the friction engagement members 60 and the concavities 63 of the friction washer 57 is described below. The friction engagement members 60 have axial end faces 60a and 60b and rotational end faces 60c. An outer circumferential surface 60g of the friction engagement member 60 is adjacent to the bottom surface 63a of the concavities 63. Further, a rotational direction gap 65 with a prescribed angle is defined between each of the rotational end faces 60c and the rotational direction end faces 63b. The total of both angles is a prescribed angle whose size allows the friction washer 57 thereof to rotate relative to the friction engagement members 60. This angle is preferably within a range that is equal to or slightly exceeds the damper operation angle created by small torsional vibrations caused by combustion fluctuations in the engine. In this embodiment, the friction engagement members 60 are disposed in the center of the direction of rotation of the concavities 63 in the neutral state shown in FIG. 6. Therefore, the size of the gap is the same on either side in the direction of rotation of the friction engagement members 60.

The friction engagement members 60 are engaged with the first plate 32 to rotate together with the first plate 32 and be movable in the axial direction. More specifically, an annular wall 32a extending toward the engine in the axial direction is formed on the radially outer edge of the first plate 32, and concavities 61 indented on the internal side in the radial direction are formed corresponding to each friction engagement member 60 on the annular wall 32a. In addition, a first slit 61a penetrating in the radial direction at the rotational center of the concavity 61 and second slits 61b penetrating in the radial direction are formed on both sides in the direction of rotation. The friction engagement members 60 have a first leg 60e extending through the first slit 61a radially inward. Furthermore, the friction engagement members 60 also have second legs 60f that extend in both rotational directions which are in contact with the inner circumferential surface of the annular wall 32a. The second legs 60f extend through the second slits 61b radially inward and extending outward in the direction of rotation. Moreover, the second legs 60f make contact with the inner circumferential surface of the annular wall 32a. As a result, the friction engagement members 60 do not move outwardly from the annular wall 32a in the radial direction. In addition, the friction engagement members 60 have convexities 60d that extend inward in the radial direction, and are engaged in the direction of rotation with the concavities 61 in the annular wall 32a. The friction engagement members 60 are thereby integrally rotated as convexities of the first plate 32. In addition, the friction engagement member 60 can be attached to and detached from the first plate 32 in the axial direction.

The friction engagement member 60 can move relative to the friction washer 57 because the axial and rotational lengths of the friction engagement member 60 are shorter than the axial and rotational lengths of the concavity 63. In other words, the distance between the axial end faces 63c and 63d is longer than the axial length of the axial end faces 60a and 60b of the friction engagement member 60, as is the rotational length between the rotational direction end faces 63b of the concavity 63 and the end faces 60c of the engagement member 60. Further, the friction engagement member 60 can also tilt relative to the friction washer 57 to a certain angle because a radial space is also provided between the outer circumferential surface 60g of the friction engagement member 60 and the bottom surface 63a of the concavity 63.

As described above, the friction washer 57 is frictionally engaged with the flexible plate 11 and the input friction plate 58 in a manner that allows movement in the direction of rotation, and is engaged in a manner that allows torque to be transmitted to the friction engagement members 60 by way of the rotational direction gap 65 in the engagement portion 64. The friction engagement members 60 can also integrally rotate with the first plate 32, and move relatively in the axial direction.

Next, referring to FIGS. 4-6, the relationship between the friction washer 57 and the friction engagement members 60 is described in greater detail. The widths in the direction of rotation (the angles in the direction of rotation) of the friction engagement members 60 are all the same, but some of the widths in the direction of rotation (the angles in the direction of rotation) of the concavities 63 are different. That is to say, there are at least two types of friction washers 57 having concavities 63 with differing widths in the rotation direction.

In this embodiment, the friction washers 57 are made of first and second friction washers 57A and 57B. Two first friction washers 57A face each other in the up and down directions in FIG. 5, and four second friction washers 57B that face each other in the left and right directions. The first friction washers 57A and concavities 63, and the second friction washers 57B and concavities 63 respectively form first and second engagement portions 64A and 64B. The first friction washers 57A and the second friction washers 57B have roughly the same shape, and are made of the same material. The only major point in which the first and second friction washers 57A and 57B differ is the length in the direction of rotation (the angles in the direction of rotation) of the rotational direction gap of the concavities 63. More specifically, the length in the direction of rotation of the concavities 63 of the second friction washers 57B is larger than the length in the direction of rotation of the concavities 63 of the first friction washers 57A. As a result, concavities 63 of the first friction washers 57A and the friction engagement members 60 have first rotational direction gaps 65A, while concavities 63 of the second friction washers 57B and the friction engagement members 60 have second rotational direction gaps 65B. Further, the second rotational direction gap 65B of the second engagement portion 64B in the second friction washers 57B is larger than the first rotational direction gap 65A of the first engagement portion 64A in the first friction washers 57A. In this embodiment, the former is preferably 10° and the latter is preferably 8°, for a difference of 2°, for example.

The first and second friction washers 57A and 57B are disposed and aligned in the direction of rotation, and both edges thereof in the direction of rotation are adjacent to each other. The first and second friction washers 57A and 57B are arranged to alternate between one first friction washer 57A for every two second friction washers 57B in the rotation direction. The angle between the edges of the washers 57A and 57B in the direction of rotation is set to a value that is greater than the difference (2°, for example) between the second rotational direction gap 65B in the second friction washers 57B and the first rotational direction gap 65A in first friction washers 57A.

6) Clutch Disk Assembly

Referring now to FIGS. 1 and 2, the clutch disk assembly 93 has a friction facing 93a disposed axially between the first friction surface 3a of the second flywheel 3 and a pressure plate 98. Further, the clutch disk assembly has a hub 93b spline-engaged with the transmission input shaft 92.

7) Clutch Cover Assembly

The clutch cover assembly 94 is primarily formed of a clutch cover 96, a diaphragm spring 97, and the pressure plate 98. The clutch cover 96 is an annular disk-like member fixed to the second flywheel 3. The pressure plate 98 is an annular member having a pressing surface adjacent to the friction facing 93a and rotates together with the clutch cover 96. The diaphragm spring 97 is supported by the clutch cover 96 to urge elastically the pressure plate 98 toward the second flywheel 3. When a release device not shown pushes the radially inner end of the diaphragm spring 97 toward the engine, the diaphragm spring 97 releases the load axially placed on the pressure plate 98.

(2) Operation

1) Torque Transmission

Referring to FIGS. 1-3, in this dual-mass flywheel 1, a torque supplied from the crankshaft 91 of the engine is transmitted to the second flywheel 3 via the damper mechanism 4. In the damper mechanism 4, the torque is transmitted through the input disk-like plate 20, coil springs 34-36, and output disk-like plates 32 and 33 in this order. Further, the torque is transmitted from the dual-mass flywheel 1 to the clutch disk assembly 93 in the clutch engaged state and is finally provided to the input shaft 92.

2) Absorption and Attenuation of Torsional Vibrations

When the dual-mass flywheel 1 receives combustion variations from the engine, the damper mechanism 4 operates to rotate the input disk-like plate 20 relatively to the output disk-like plates 32 and 33 so that the coil springs 34-36 are compressed in parallel in the rotational direction. Further, the first friction generation mechanism 5 and the second friction generation mechanism 6 generate a predetermined hysteresis torque. Through the foregoing operations, the torsional vibrations are absorbed and damped.

Figure 15:
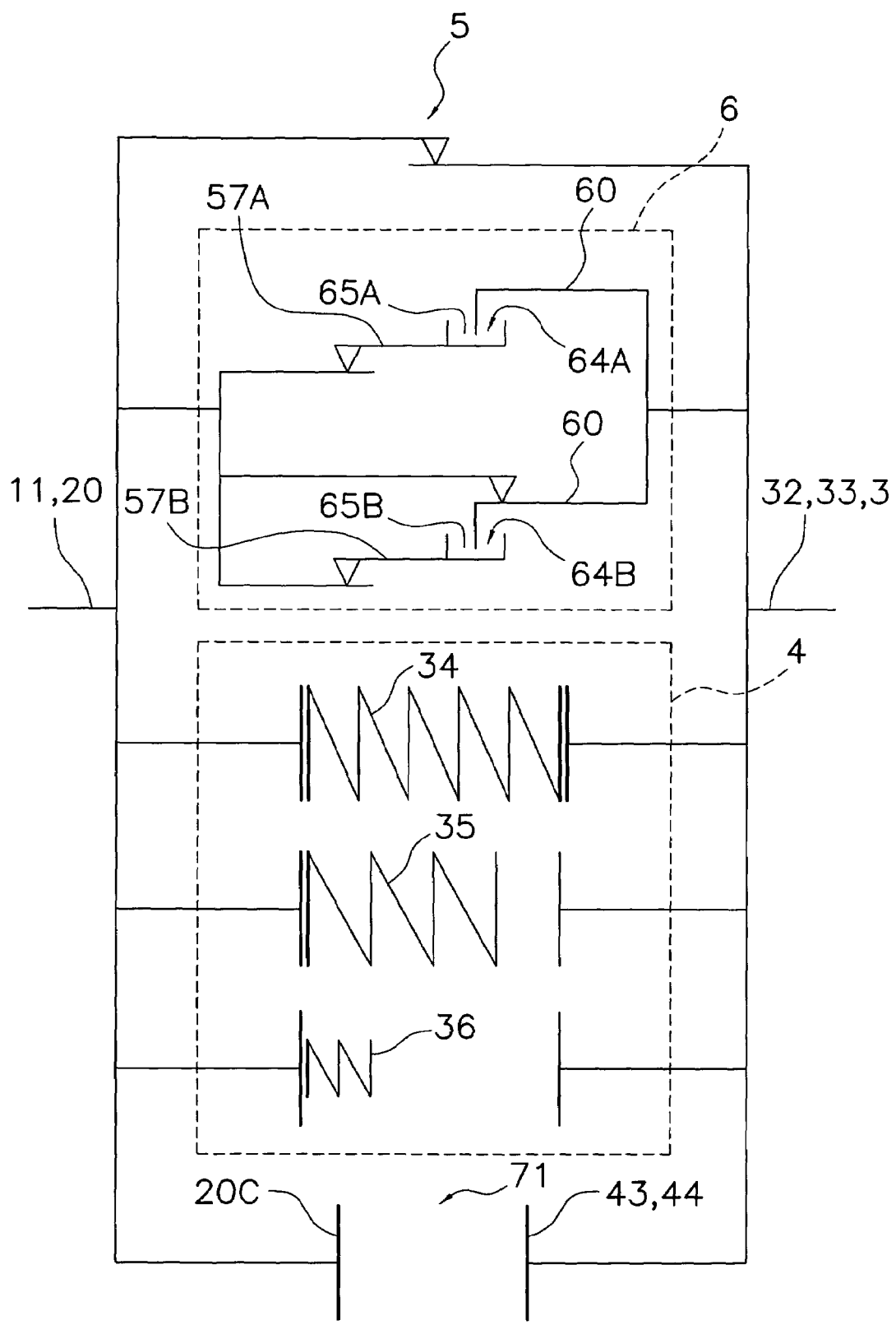
FIG. 15 is a view of a mechanical circuit diagram of the damper mechanism and the friction generation mechanisms of the dual-mass flywheel.
Figure 16:
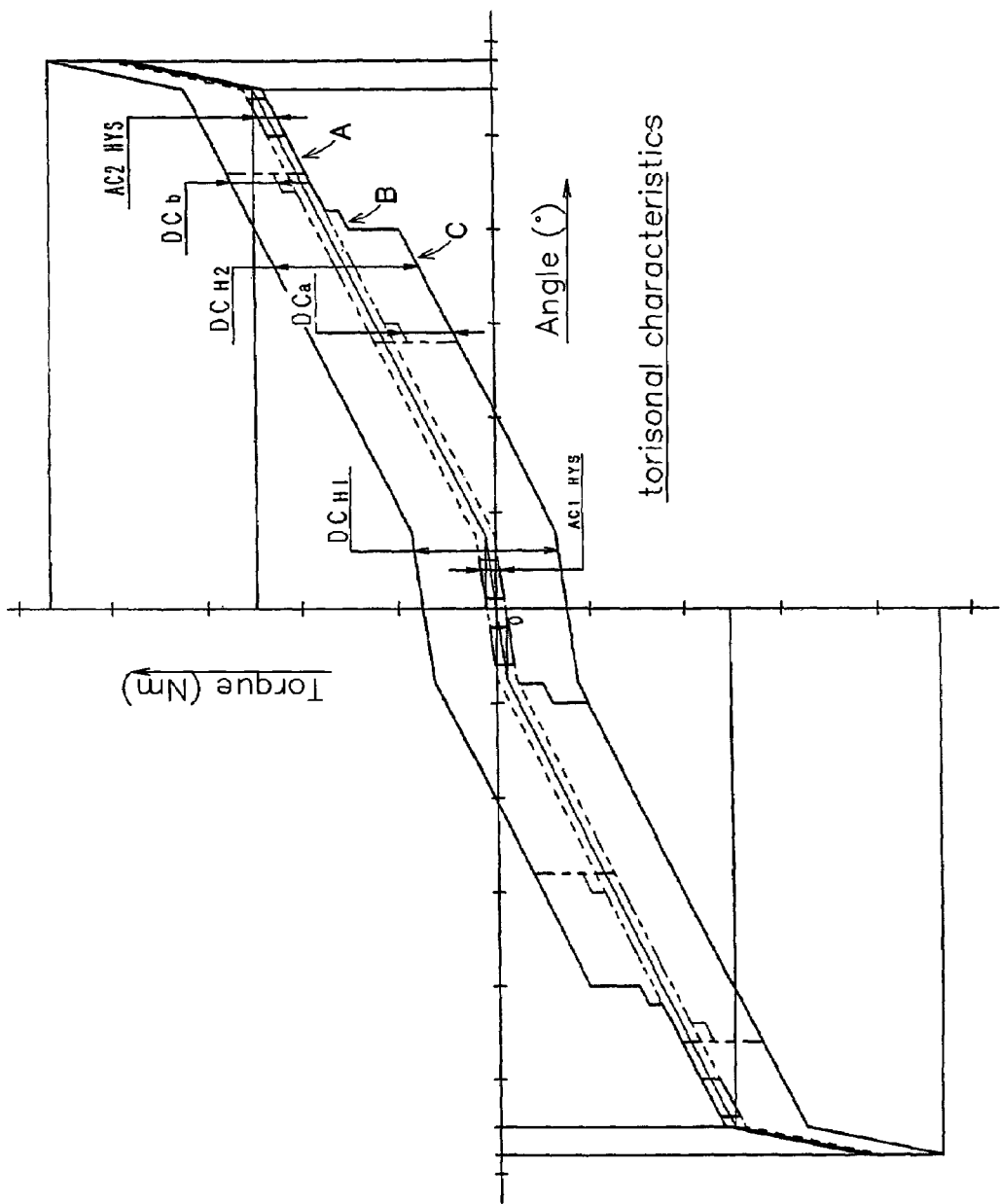
FIG. 16 is a diagram of torsional characteristics of the damper mechanism and the friction generation mechanisms.

Next, the operation of the damper mechanism 4 is described referring to FIG. 15 and to the torsional characteristics of FIG. 16. In a small torsional angle area around zero degrees, only the first coil springs 34 are compressed to achieve a relatively low rigidity. As the torsional angle becomes larger, the first coil springs 34 and the second coil spring 35 are compressed in parallel to achieve a relatively high rigidity. As the torsional angle becomes even larger, the first coil springs 34, the second coil springs 35, and the third coil springs 36 are compressed in parallel to achieve the highest rigidity allowed at the ends of the torsional characteristics. The first friction generation mechanism 5 operates over the entire torsional angle range. The second friction generation mechanism 6 does not operate within certain angles on either side of the torsional angle after the direction of the torsional action changes.

Next, referring to FIGS. 4-6 and 15, the operation performed when the friction washer 57 is driven by the friction engagement member 60 is described. The operation in which the friction engagement member 60 is twisted from the neutral state in the rotation direction R1 in relation to the friction washer 57 is described.

When the torsion angle increases, the first friction engagement member 60 in the first friction washers 57A eventually make contact with the rotational direction end face 63b on the rotational direction R1 side of the concavities 63 of the first friction washers 57A. At this time, the friction engagement member 60 in the second friction washers 57B have a rotational direction gap (which is half the difference between the second rotation direction gap 65B of the second friction washers 57B and the first rotational direction gap 65A of the first friction washers 57A, and is 1° in this embodiment) in the rotational direction end face 63b of the concavities 63 of the second friction washers 57B in the rotational direction R1.

When the torsion angle further increases, the friction engagement member 60 drives the first friction washers 57A, and causes them to slide in relation to the flexible plate 11 and the input friction plate 58. At this time, the first friction washers 57A approach the second friction washers 57B in the rotational direction R1, but the edge portions of both of these do not make contact.

When the torsion angle finally achieves a prescribed magnitude, the friction engagement members 60 make contact with the rotational direction end face 63b of the concavities 63 of the second friction washers 57B. After this, the friction engagement members 60 drives both the first and second friction washers 57A and 57B, causing them to slide in relation to the flexible plate 11 and the input friction plate 58.

In summation, driving the friction washer 57 with the aid of the first plate 32 yields an area in which some number of plates is driven to generate an intermediate frictional resistance in the torsion characteristics before the start of the large frictional resistance area in which all of the plates are driven.

2-1) Small Torsional Vibrations

The operation of the damper mechanism 4 when small torsional vibrations caused by combustion fluctuations of the engine are input to the dual-mass flywheel 1 is described below with reference to the mechanical circuit diagram in FIG. 15 and the diagrams of torsional characteristics in FIGS. 16 to 19.

When small or minute torsional vibrations are input, the input disk-like plate 20 in the second friction generation mechanism 6 rotates relative to the friction washers 57A and 57B in the rotational direction gaps 65A and 65B between the friction engagement member 60 and the concavities 63. In other words, the friction washers 57A and 57B are not driven with the input disk-like plate 32, and the friction washers 57A and 57B therefore do not rotate in relation to the member on the input side. As a result, high hysteresis torque is not generated for small torsional vibrations. That is, although the coil springs 34 and 36 operate at "AC 2HYS," for example, in the diagram of torsional characteristics in FIG. 16, slippage does not occur in the second friction generation mechanism 6. That is to say, only a hysteresis torque that is much smaller than a normal hysteresis torque can be obtained in a prescribed range of torsion angles. Thus, the vibration and noise level can be considerably reduced because a very narrow rotational direction gap is provided in which the second friction generation mechanism 6 does not operate in the prescribed angle range.

Figure 17:
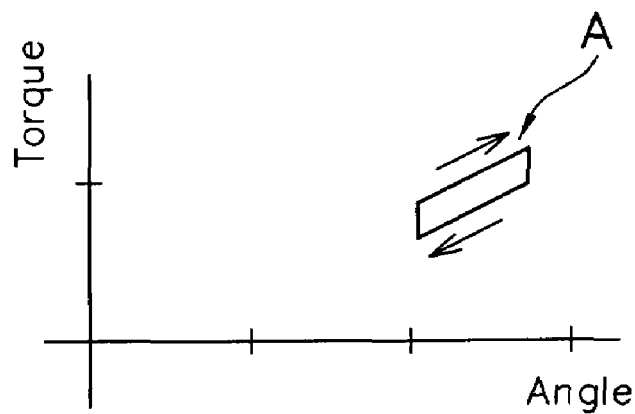
FIG. 17 is a diagram of torsional characteristics of the damper mechanism and the friction generation mechanisms.
Figure 18:
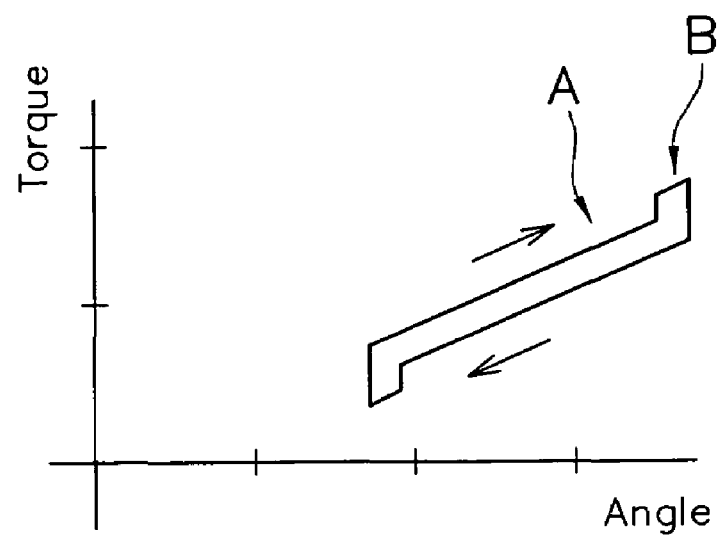
FIG. 18 is a diagram of torsional characteristics of the damper mechanism and the friction generation mechanisms.
Figure 19:
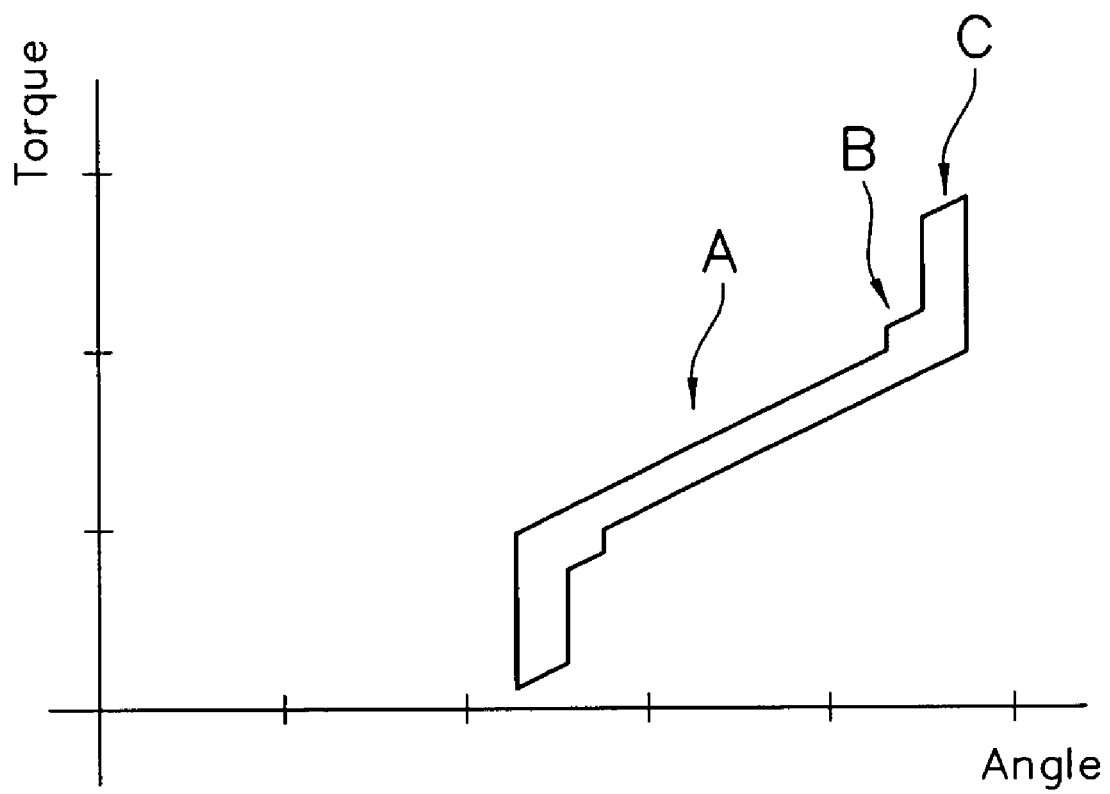
FIG. 19 is a diagram of torsional characteristics of the damper mechanism and the friction generation mechanisms.

As a result, when the operating angle of the torsional vibration is equal to or less than the angle (8°, for example) of the first rotational direction gap 65A of the first engagement portion 64A of the first friction washers 57A, large frictional resistance (high hysteresis torque) is not generated at all, and only area A of low frictional resistance is obtained in the second stage of torsion characteristics, as shown in FIG. 17. Moreover, when the operating angle of the torsional vibration is equal to or greater than the angle (8°, for example) of the first rotational direction gap 65A of the first engagement portion 64A of the first friction washers 57A, and is equal to or less than the angle (10°, for example) of the second rotational direction gap 65B of the second engagement portion 64B of the second friction washers 57B, the area B of intermediate frictional resistance is generated on the edge of the area A of low frictional resistance, as shown in FIG. 18. When the operating angle of the torsional vibration is equal to or greater than the angle (10°, for example) of the second rotational direction gap 65B of the second engagement portion 64B of the second friction washers 57B, the area B of intermediate frictional resistance and the area C in which some large frictional resistance is generated are respectively obtained on both edges of the area A of low frictional resistance, as shown in FIG. 19.

2-2) Wide-Angle Torsional Vibrations

Operation of the second friction generation mechanism 6 when wide-angle torsional vibrations are input will be explained. In the second friction generation mechanism 6, the friction washers 57A and 57B rotate together with the friction engagement members 60 and the first plate 32, and relative to the flexible plate 11 and the friction plate 58. As a result, the friction washers 57A and 57B and the friction engagement member 60 slide against the flexible plate 11 and the input friction plate 58 to generate frictional resistance.

As described above, when the torsional angle of the torsional vibration is large, the friction washers 57A and 57B rotate together with the friction engagement members 60 and the first plate 32 and slide against the flexible plate 11 and the input friction plate 58. As a result, the friction washers 57A and 57B slide against the flexible plate 11 and the input friction plate 58 to generate a frictional resistance over the entire range of torsional characteristics.

Here, the operation in the edge portion (position in which the direction of the vibration changes) of the torsion angle is described. At the right-hand edge of the torsion characteristic line chart of FIG. 16, the friction washers 57A and 57B are shifted most in the rotational direction R2 in relation to friction engagement member 60. When the friction engagement member 60 twists from this state in the rotational direction R2 in relation to the output disk-like plates 32 and 33, the friction washers 57A and 57B and the friction engagement member 60 rotate relative to each other across the entire angle of the rotational direction gaps 65A and 65B of the friction engagement member 60 and concavities 63. During this operation, the area A (8°, for example) of low frictional resistance can be obtained because the friction washers 57A and 57B do not slide against the member on the input side. Next, when the first rotational direction gap 65A of the first engagement portion 64A of the first friction washers 57A is no longer present, the first plate 32 drives the first friction washers 57A. Then, the first friction washers 57A rotate relative to the flexible plate 11 and the input friction plate 58. As a result, the area B of intermediate frictional resistance (2°, for instance) is generated as described above. When the second rotational direction gap 65B of the second engagement portion 64B of the second friction washers 57B is no longer present, the first plate 32 subsequently drives the second friction washers 57B. Then, the second friction washers 57B rotate relative to the flexible plate 11 and the input friction plate 58. The area C of comparatively large frictional resistance is generated because both the first friction washers 57A and the second friction washers 57B slide at this time. In addition, hysteresis torque generated by the friction washers 57A is lower than that generated by the second friction washers 57B and preferably the former is almost half of the latter in this embodiment.

As described above, the area B of intermediate frictional resistance is provided at an early stage of a large frictional resistance generation. A barrier of high hysteresis torque does not exist when a large frictional resistance is generated because the buildup of large frictional resistance is graduated in this manner. As a result, the knocking sound of the pawls when high hysteresis torque is generated decreases in a frictional resistance generation mechanism with a very narrow rotational direction gap to absorb small torsional vibrations.

In particular, the number of types of frictional members can be kept low in the present invention because a single type of friction washer 57 is used to generate intermediate frictional resistance. The friction washer 57 is also a simple structure that extends in the form of an arc. Furthermore, a through-hole in the axial direction is not formed in the friction washer 57, and thus manufacturing costs can be kept low.

(3) Advantages 3-1) First Friction Generation Mechanism

The sliding area of the first friction generation mechanism 5 is set to be relatively large because the first friction generation mechanism 5 makes use of a part of the second flywheel 3 as a friction surface. Specifically, as shown in FIGS. 7 and 8, the second friction member 52 is urged against the second flywheel 3 by the cone spring 53. Accordingly, the pressure per area on the sliding surface is reduced so that the life of the first friction generation mechanism 5 is prolonged.

The radially outer portion of the second friction member 52 and the radially inward portion of the first and second coil springs 34 and 35 overlap in the axial direction. That is to say, the radial position of the outer circumferential edge of the second friction member 52 is radially outward of a radial position of the inner circumferential edge of the first and second coil springs 34 and 35. Accordingly, although the second friction member 52 and the first and second coil springs 34 and 35 are very close to each other in the radial direction, it is possible to provide an adequate or superior friction area in the second friction generation mechanism 6, The radially outer portion of the annular portion 51a of the first friction member 51 and radially inner portions of the first and second coil springs 34 and 35 overlap when viewed along the axis of rotation O-O. Further, a radial position of radially outer edges of the annular portion 51a is radially outward that of radially inner edges of the first and second coil springs 34 and 35. It is possible to provide a large friction surface for the first frictional resistance mechanism 5 even though the annular portion 51a and the first and second coil springs 34 and 35 are very closely located in the radial direction.

Only the first friction member 51 is nonrotatably engaged with the input disk-like plate 20 and the first friction member 51 and the second friction member 52 are nonrotatably engaged with each other. Accordingly, it is unnecessary to engage directly the second friction member 52 with the input disk-like plate 20, thereby making the structure simpler.

Figure 10:
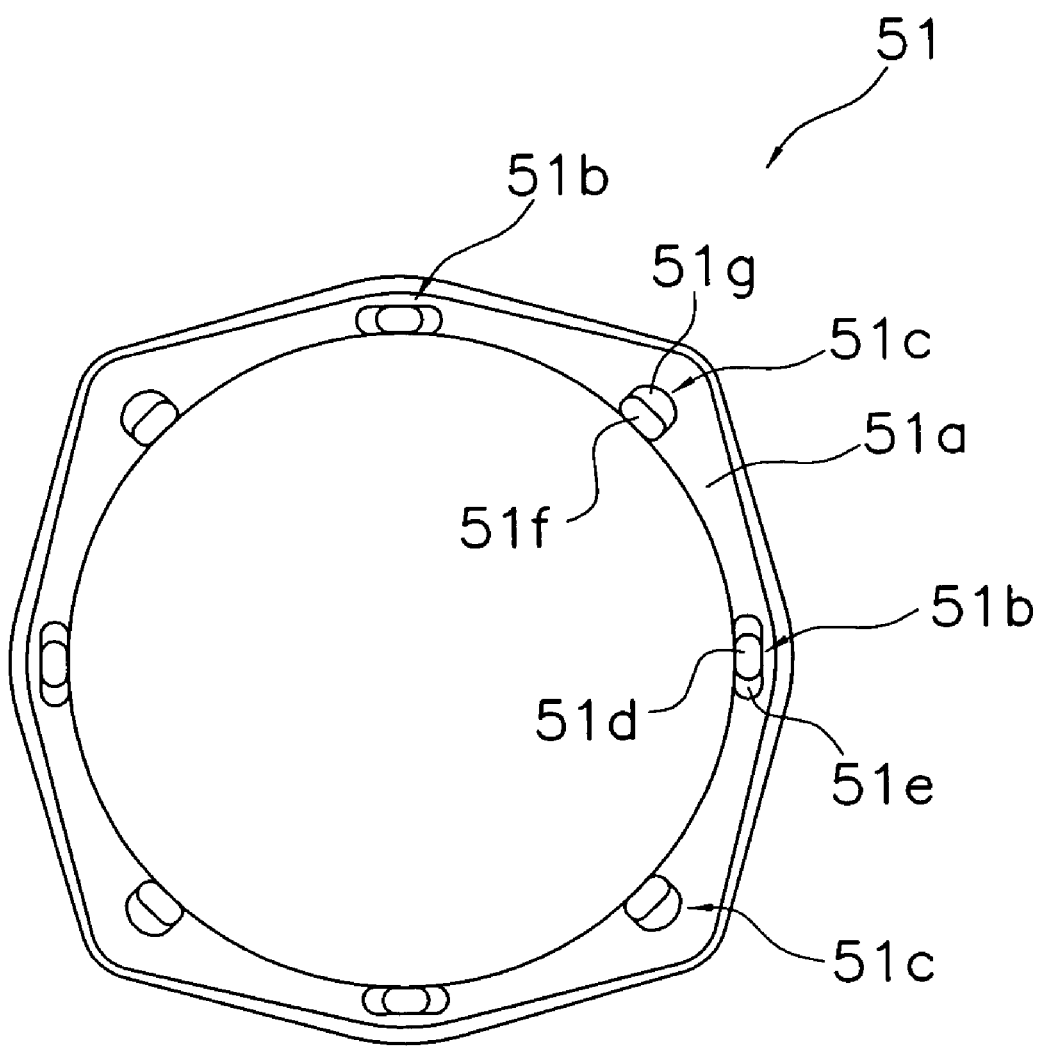
FIG. 10 is an elevational view of a first friction washer of the first friction generation mechanism.

As shown in FIGS. 7, 8, and 10, the first friction member 51 is composed of the annular portion 51a in contact with the first plate 32 to slide in the rotational direction, and a plurality of the engagement portions 51b and 51c extending from the annular portion 51a and engaging with the input disk-like plate 20 to move relatively in the axial direction but not in the rotational direction. The second friction members 52 are formed with a plurality of recesses 52a with which the engagement portions 51b and 51c are engaged to move in the axial direction but not in the rotational direction. Accordingly, it is easy to realize a structure in which the annular portion 51a of the first friction member 51 and the second friction member 52 are disposed apart from each other in the axial direction because the first friction member 51 has the engagement portions 51b and 51c extending axially.

The cone spring 53 is disposed between the second friction member 52 and the engagement portions 51b and 51c of the first friction member 51 and urges both the members in the axial direction, thereby making the structure simpler.

The washer 54 is seated on the tip of the engagement portions 51b and 51c of the first friction member 51 and receives a load from the cone spring 53. The washer 54 provides the axial load applied to the friction sliding surface so that the frictional resistance generated on the sliding surface is stable.

As seen in FIG. 1, the first friction generation mechanism 5 is disposed radially inward of the clutch friction surface 3a of the second flywheel 3, and apart from each other. Accordingly, the first friction generation mechanism 5 is unlikely to be affected by the heat from the clutch friction surface 3a, thereby stabilizing frictional resistance.

The first friction generation mechanism 5 is disposed radially inward of the radial center of the first and second coil springs 35 and radially outward of the radially outermost edge of the bolts 22, thereby ensuring a structure with a small space.

3-2) Second Friction Generation Mechanism 6

As seen in FIGS. 1, 2, and 4, the second friction generation mechanism 6 is unlikely to be affected by the heat from the clutch friction surface 3a of the second flywheel 3 and has stable characteristics because the second friction generation mechanism 6 is held by the first flywheel 2, more specifically by the flexible plate 11. In particular, the first flywheel 2 is unlikely to receive the heat from the second flywheel 3 because the first flywheel 2 is connected to the second flywheel 3 by way of the coil springs 34-36. Further, the clutch friction surface 3a is on a side of the second flywheel 3 that is axially opposite the second friction generation mechanism 6.

The second friction generation mechanism 6 makes use of the annular portion 11a of the flexible plate 11 as a friction surface so that the number of components of the second friction generation mechanism 6 is reduced and the structure simplified.

The second friction generation mechanism 6 is disposed radially outward of the clutch friction surface 3a and apart from each other in the radial direction so that the second friction generation mechanism 6 is unlikely to be affected by the heat from the clutch friction surface 3a.

3-3) Flexible Flywheel (First Flywheel 2 and Damper Mechanism 4)

The first flywheel 2 is composed of the inertia member 13 and the flexible plate 11 to connect the inertia member 13 to the crankshaft 91 and is elastically deformable in the bending direction, which is substantially parallel to the axis of rotation of the crankshaft 91. The damper mechanism 4 is composed of the input disk-like plate 20 to which the torque is inputted from the crankshaft 91, the output disk-like plates 32 and 33 disposed rotatable relative to the input disk-like plate 20, and the coil springs 34-36 arranged to be compressed in the rotational direction by the relative rotation of both the members. The first flywheel 2 can move in the bending direction within limits relative to the damper mechanism 4. A combination of the first flywheel 2 and the damper mechanism 4 constitute a flexible flywheel.

When bending vibrations are inputted to the first flywheel 2, the flexible plate 11 deforms in the bending direction to absorb the bending vibrations from the engine. In this flexible flywheel, the bending vibration absorption effect by the flexible plate 11 is very high because the first flywheel 2 can move in the bending direction relative to the damper mechanism 4.

The flexible flywheel further includes the second friction generation mechanism 6. The second friction generation mechanism 6 is disposed between the first flywheel 2 and output disk-like plate 32 of the damper mechanism 4 and operates in parallel with the coil springs 34-36 in the rotational direction. The second friction generation mechanism 6 has the friction washers 57A and 57B and the friction engagement members 60, which are engaged with each other not only to transmit the torque but also to move in the bending direction relative to each other. In this flexible flywheel, the first flywheel 2 can move relative to the damper mechanism 4 in the bending direction within limits even though they are engaged with each other by way of the second friction generation mechanism 6 because two members are engaged with each other to move relatively in the bending direction. As a result, the bending vibration absorption effect by the flexible plate 11 is very high.

The friction washers 57A and 57B and the friction engagement member 60 are engaged with each other with the rotational direction gaps 65A and 65B in the rotational direction. Large resistance is not generated by the relative movement in the bending direction because they are not in close contact with each other in the rotational direction.

The friction engagement member 60 is engaged with the output disk-like plates 32 and 33 to move in the axial direction. Therefore, axial resistance is unlikely to be generated between the friction engagement member 60 and the output disk-like plates 32 and 33 in the axial direction when the friction washer 57 moves together with the first flywheel 2 in the axial direction.

3-4) Third Coil Spring 36

Referring now to FIGS. 1 and 3, the third coil springs 36 starts operation in the area where torsional angle becomes large to apply adequate stopper torque to the damper mechanism 4. The third coil springs 36 are functionally disposed in parallel to the first and second coil springs 34 and 35 in the rotational direction.

The third coil spring 36 respectively has a wire diameter and a coil diameter smaller by approximately half than those of the first and second coil springs 34 and 35, thereby making the occupied axial space smaller when compared to conventional structures. As shown in FIGS. 1 and 3, the third coil springs 36 are disposed radially outward of the first and second coil springs 34 and 35 and correspond to the clutch friction surface 3a of the second flywheel 3 in the radial direction. In other words, radial position of the third coil springs 36 is within an annular area defined by the inner circumferential edge and the outer circumferential edge of the clutch friction surface 3a.

In this embodiment, providing the third coil springs 36 improves the capability of the flywheel assembly by raising the stopper torque. Further, only a small amount space is used for the third coil springs 36 because of the dimension and location of the third coil springs 36. Moreover, the coil diameter of each third coil spring 36 is smaller than those of the first and second coil springs 34 and 35 so that the axial length of the whole area where the third coil spring 36 is disposed is relatively small. Preferably, the coil diameter of the third coil spring 36 is in the range of 0.3-0.7 of the coil diameter of the first and second coil springs 34 and 35. As a result, although the third coil springs 36 are disposed at a place corresponding to the clutch friction surface 3a of the second flywheel, where the axial thickness is the largest in the second flywheel 3, the axial length of the area where third coil spring 36 is disposed is relatively small, and, in fact, is smaller than the area where the first and second coil springs 34 and 35 are disposed.

In addition, the radial position of the stopper mechanism 71 composed of the projections 20c of the input disk-like plate 20 and the contact portions 43 and 44 of the output disk-like plates 32 and 33 is within the annular area of the clutch friction surface 3a, and is disposed at the same radial position with the third coil springs 36. Therefore, the radial dimension of the whole structure is smaller relative to structures in which the members are located at different radial positions.

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

2. Second Embodiment

Next, a structure of a dual-mass flywheel 101 according to a second embodiment of the present invention will be explained. Explanation regarding parts and structure that are the same as those of the first embodiment will be omitted and differences will be highlighted.

Figure 20:
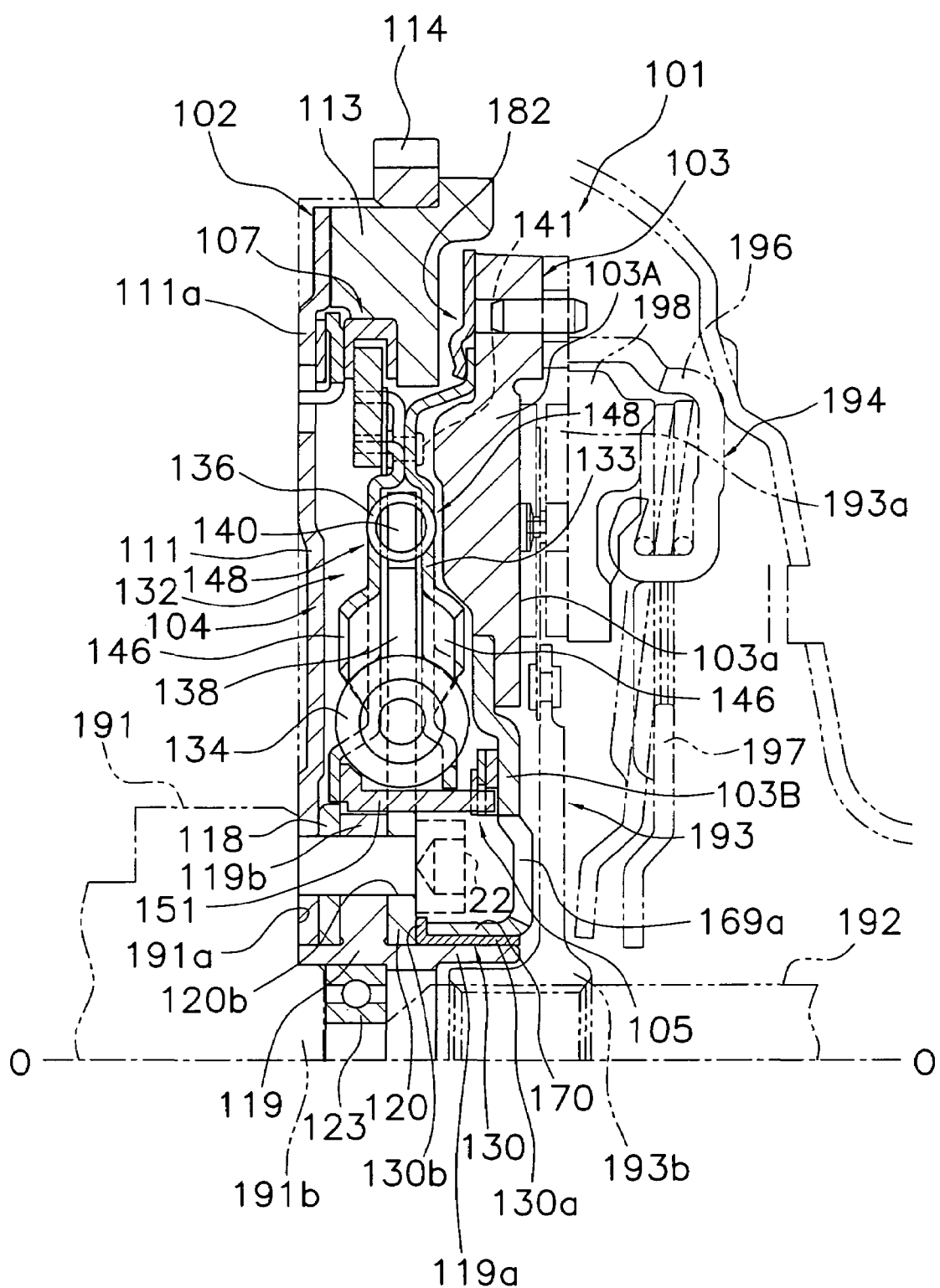
FIG. 20 is a schematic cross-sectional view of a dual-mass flywheel in accordance with a second preferred embodiment of the present invention.

Referring initially to FIG. 20, a second flywheel 103 is an annular disk member located on the transmission side of a first flywheel 102 in the axial direction. The second flywheel 103 is composed of a flywheel main body 103A and a positioning member 103B to position or to center radially the flywheel main body 103A relative to a member of the crankshaft side. The flywheel main body 103A is an annular member having a thickness in the axial direction and is formed with an annular and flat clutch friction surface 103a on the transmission side in the axial direction with which a clutch disk assembly 193 is frictionally engaged.

Figure 22:
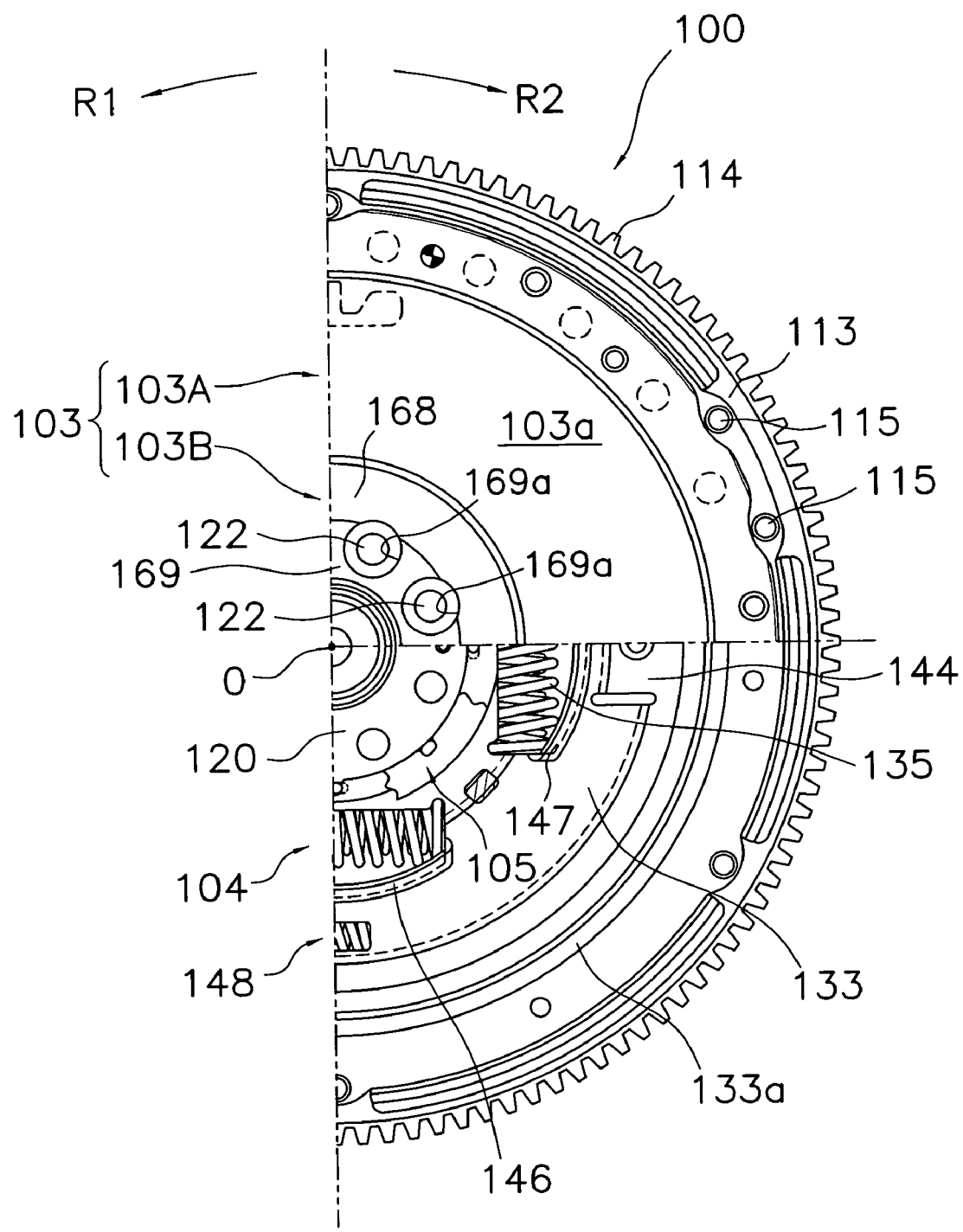
FIG. 22 is an elevational view of the dual-mass flywheel of FIG. 20 with sections removed for illustrative purposes.
Figure 24:
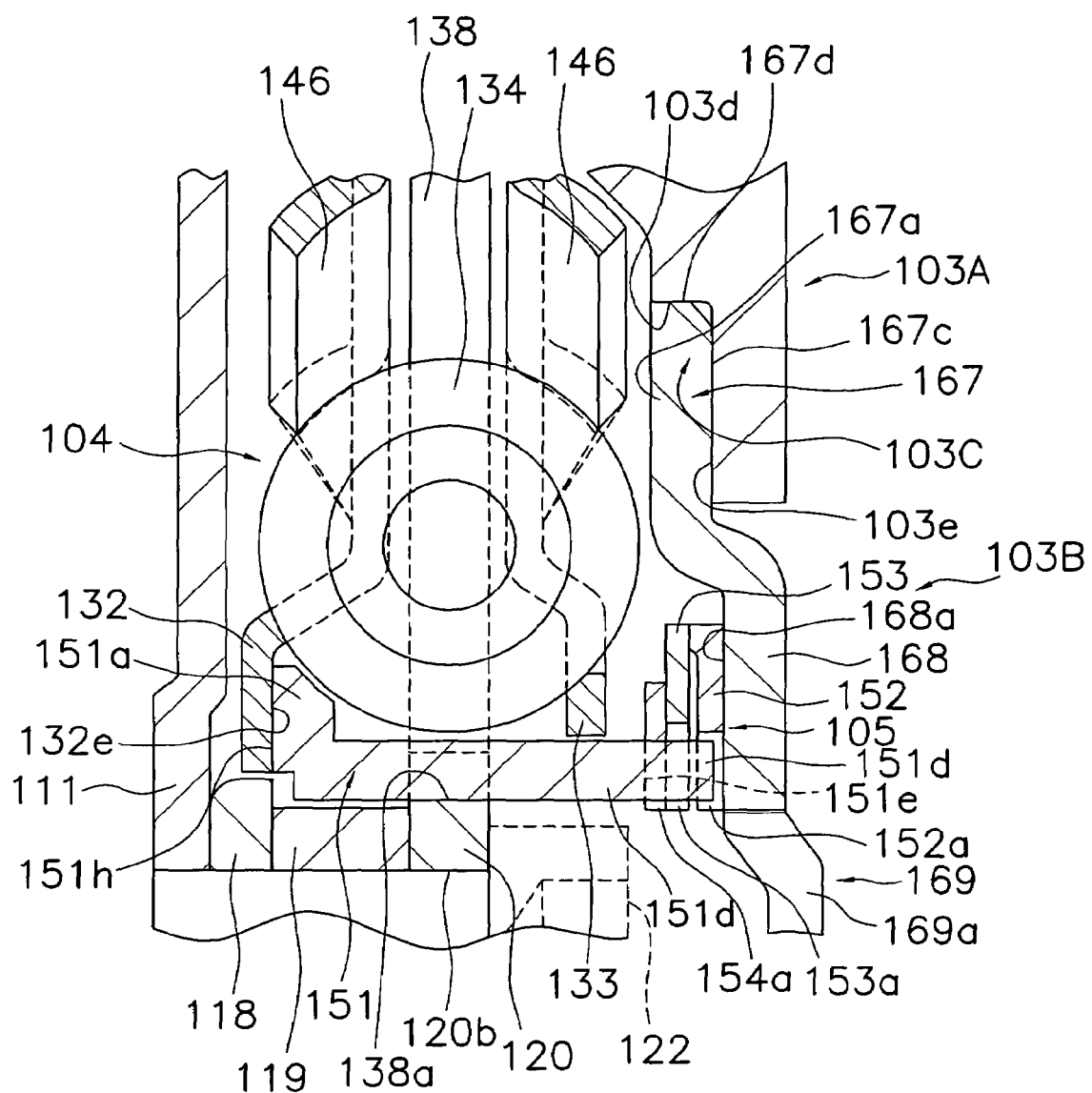
FIG. 24 is an enlarged cross-sectional view of a first friction generation mechanism of the dual-mass flywheel of FIG. 20.
Figure 25:
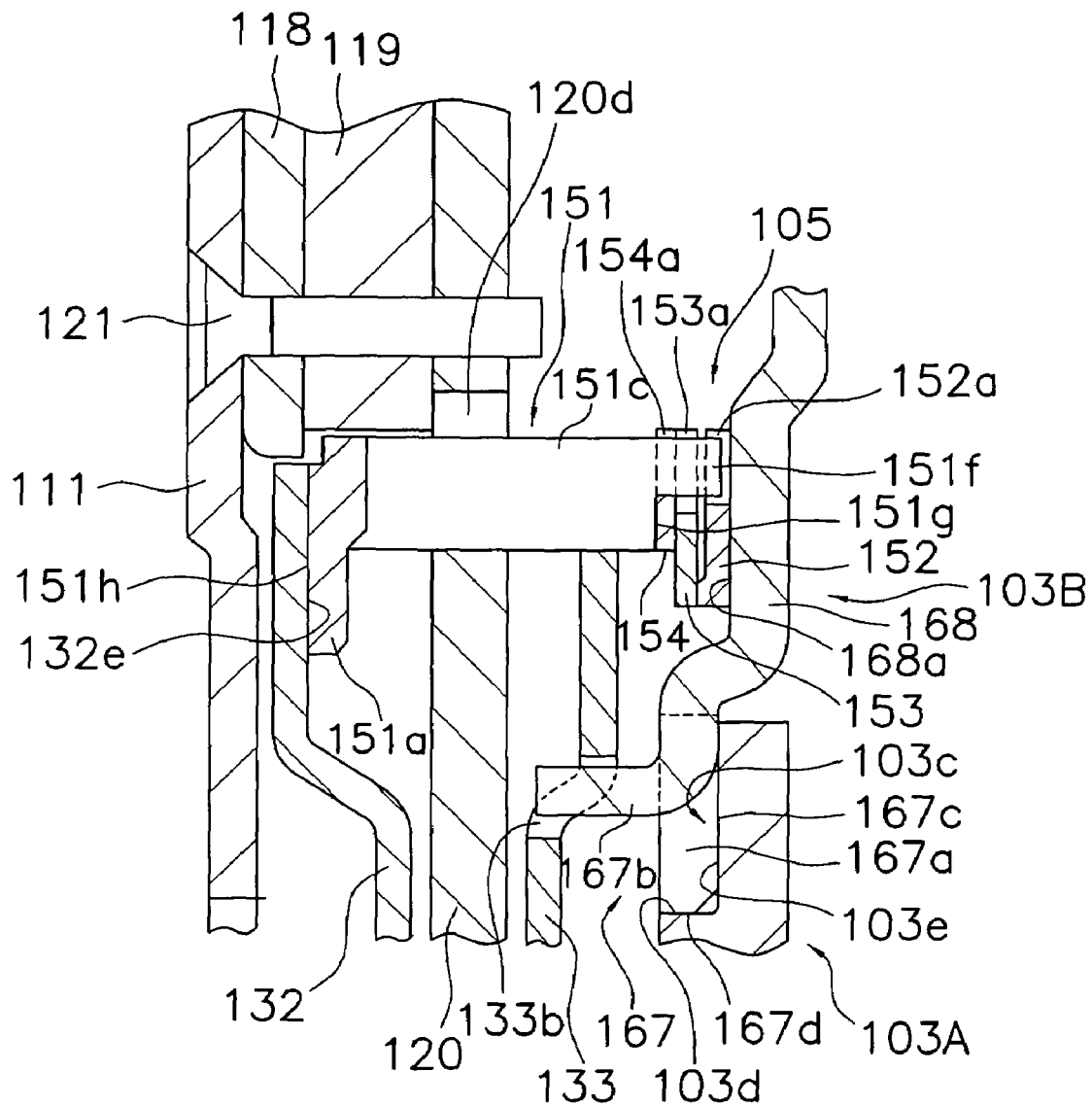
FIG. 25 is an enlarged cross-sectional view of the first friction generation mechanism.
Figure 26:
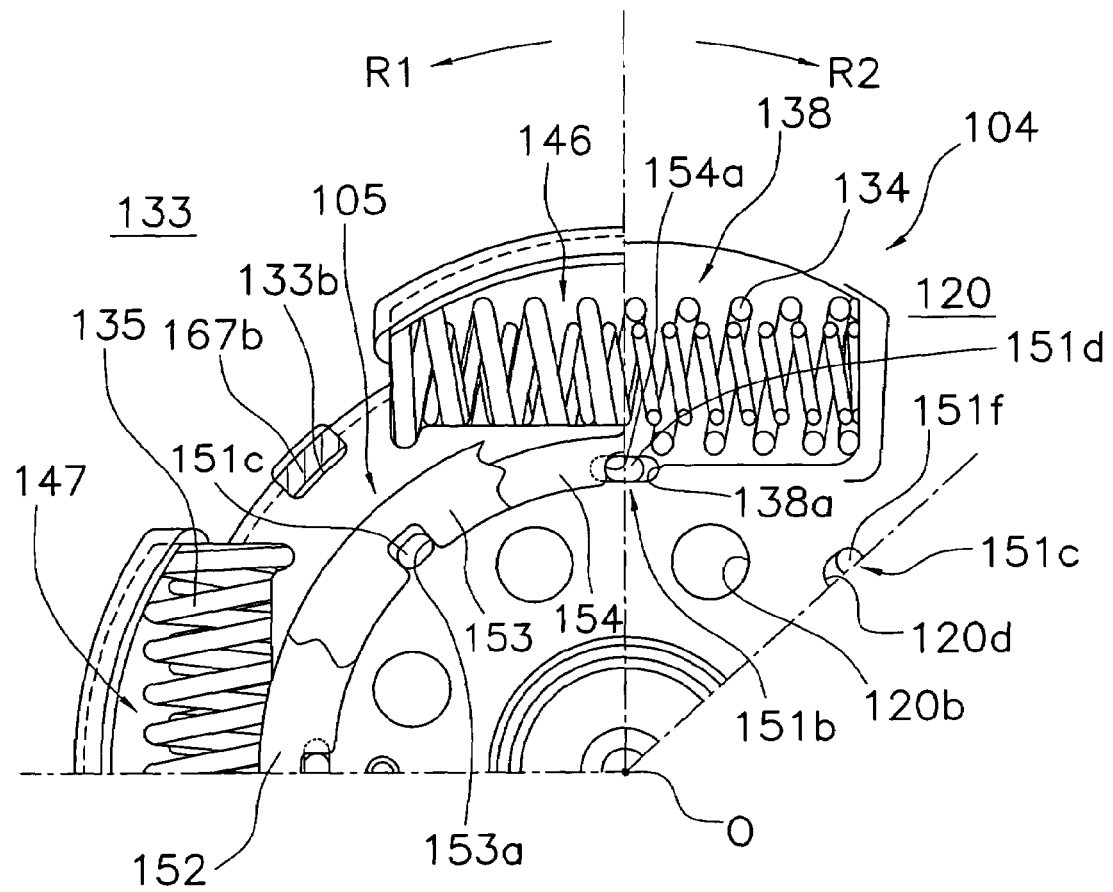
FIG. 26 is an enlarged elevational view of the first friction generation mechanism.
Figure 27:
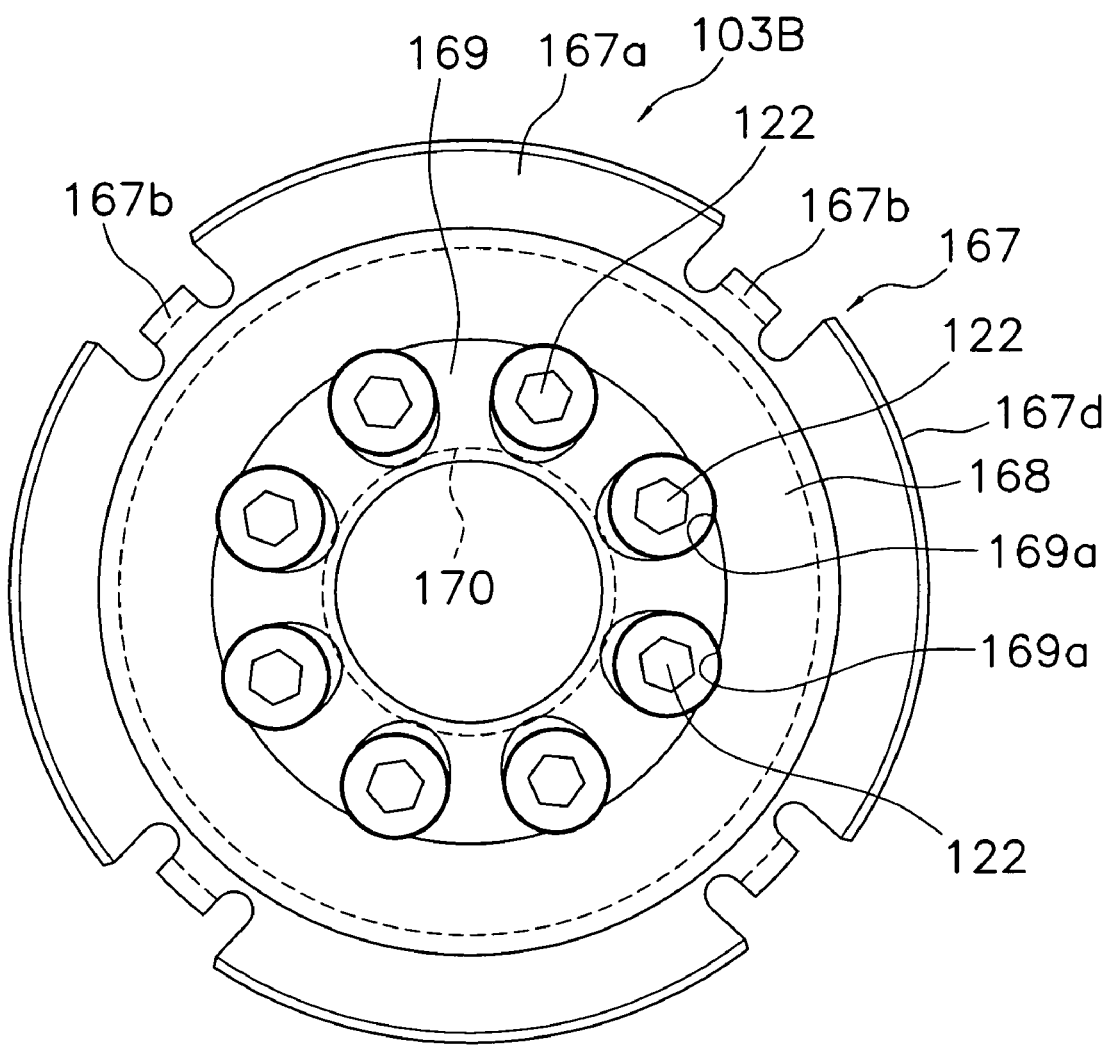
FIG. 27 is an enlarged elevational view of a positioning member of the dual-mass flywheel of FIG. 20.
Figure 28:
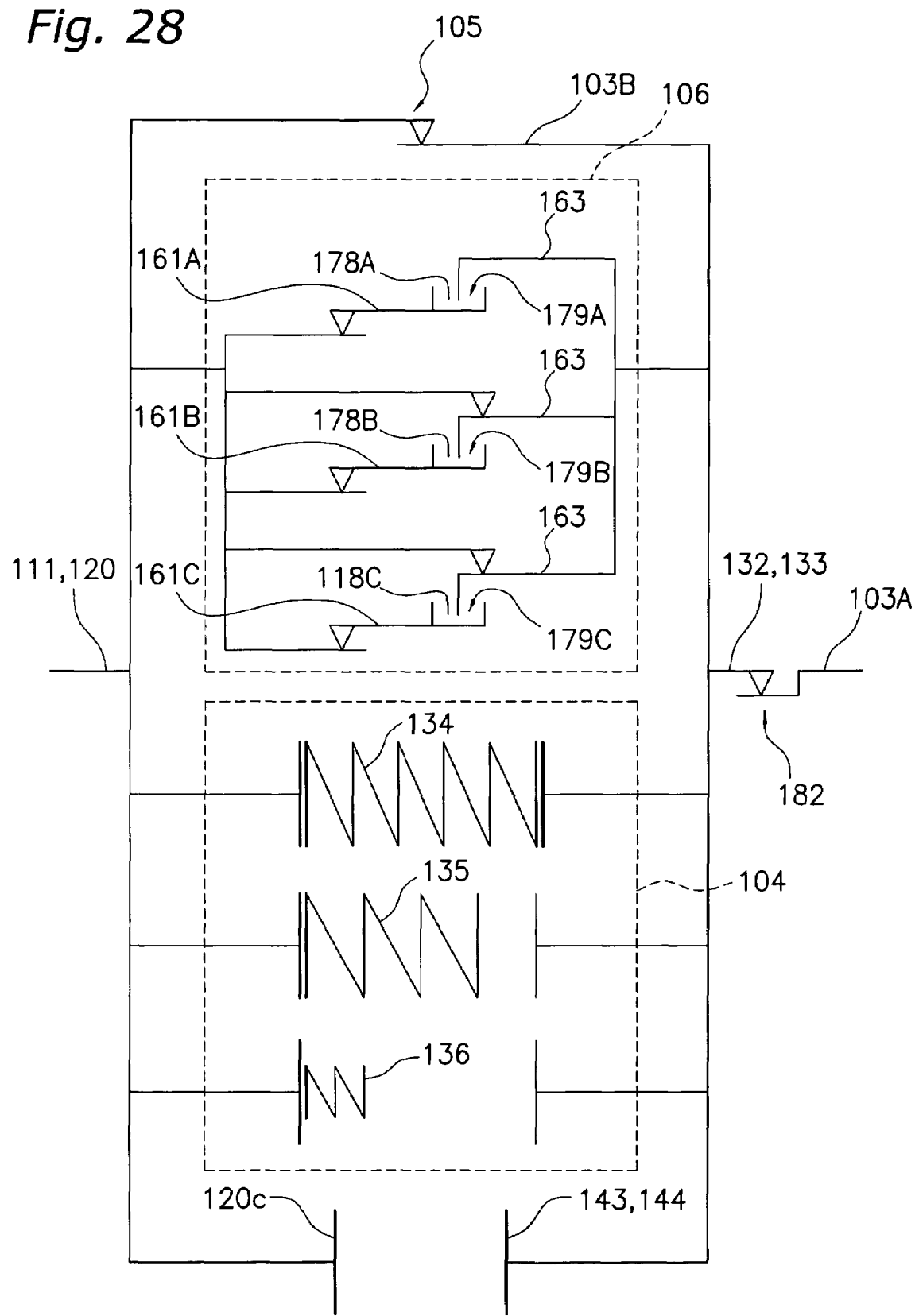
FIG. 28 is a view of a mechanical circuit diagram of a damper mechanism and the friction generation mechanisms of the dual-mass flywheel of FIG. 20.

The positioning member 103B is an annular plate member preferably made of a sheet metal located radially inward of the flywheel main body 103A. The positioning member 103B has an outer circumferential portion 167 contacting an inner circumferential portion of the flywheel main body 103A to support the flywheel main body 103A in the radial direction, as shown in FIGS. 24, 25, and 27. As shown in FIG. 27, the outer circumferential portion 167 has an annular portion 167a extending generally in the circumferential direction and a plurality of engagement portions 167b dividing the annular portion 167a. Referring to FIGS. 25 and 27, an outer peripheral surface 167d of the annular portion 167a is in contact with an inner peripheral surface 103d of an concave portion 103c formed at the radially inward portion of the flywheel main body 103A for relative rotation. In addition, an axial surface 167c on the transmission side of the annular portion 167a is in contact with an axial surface 103e on the engine side of the concave portion 103c. The positioning member 103B has a radially middle portion 168. The radially middle portion 168 is a generally flat portion, i.e., perpendicular to the rotational axis O-O, having an annular flat friction surface 168a on the engine side in the axial direction. Furthermore, as shown in FIGS. 20, 22, and 27, the positioning member 103B has a radially inward portion 169 formed with a plurality of through holes 169a through which bolts 122 penetrate. The through holes 169a are arranged in the circumferential direction with equal distances therebetween. The bolts 122 are located on the engine side of the through holes 169a as shown in FIG. 20. The positioning member 103B has an inner cylindrical portion 170 extending toward the engine in the axial direction from the radially inner edge.

Figure 21:
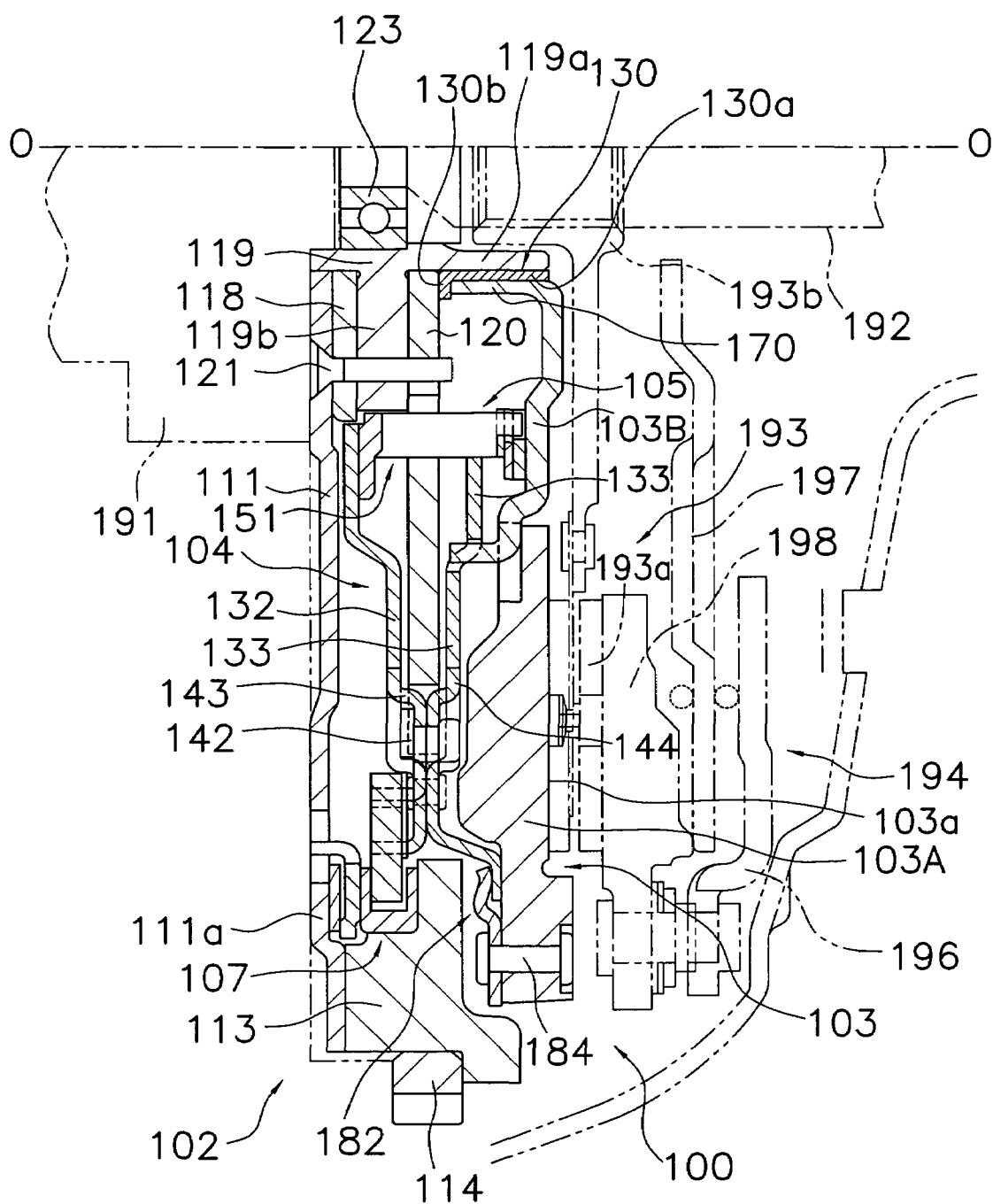
FIG. 21 is an alternate schematic cross-sectional view of the dual-mass flywheel of FIG. 20.
Figure 23:
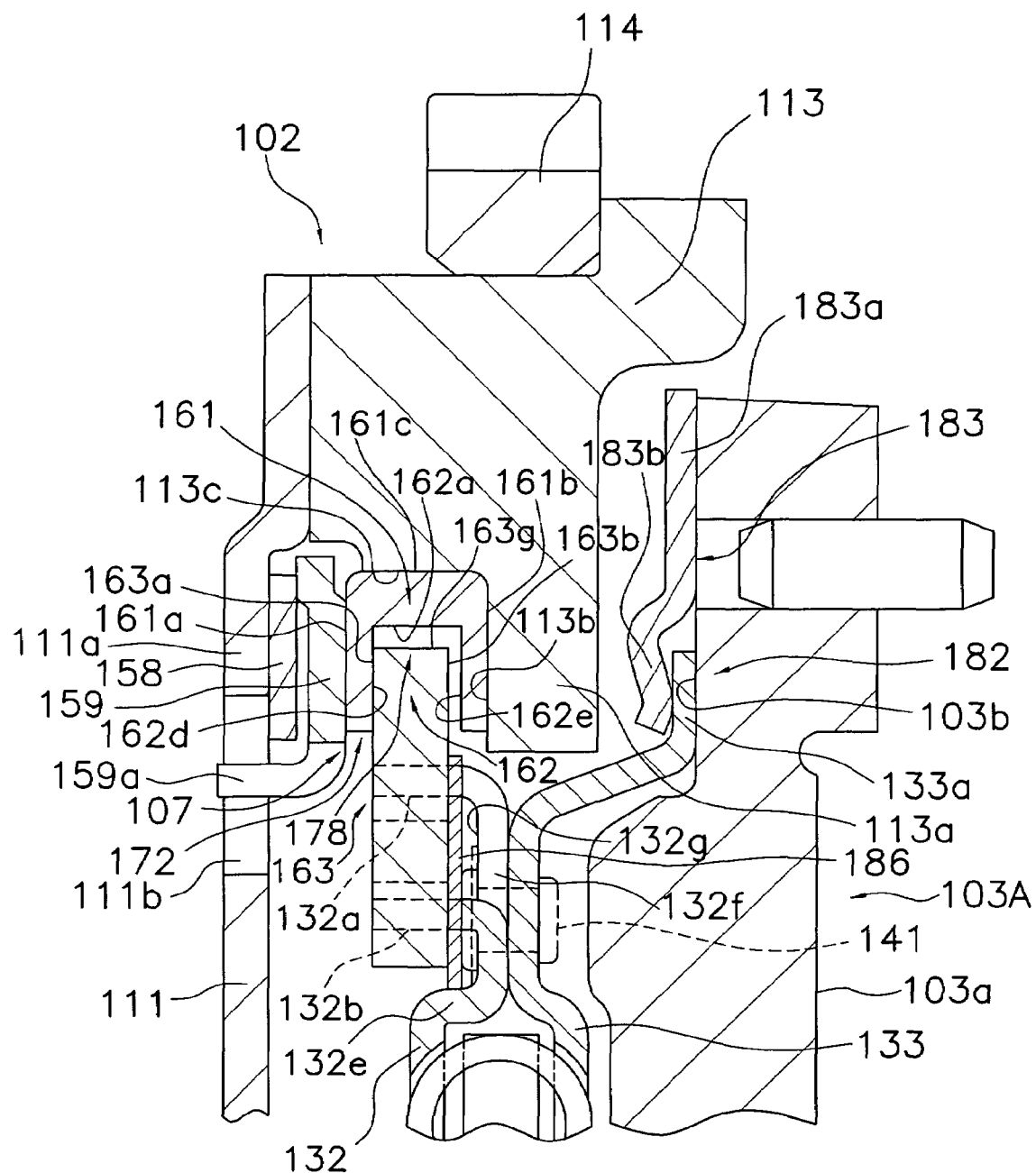
FIG. 23 is an enlarged fragmentary cross-sectional view that particularly illustrates a second frictional resistance generating mechanism of the dual-mass flywheel of FIG. 20.

A second plate 133 is connected to the radially outward portion of the second flywheel 103 through a slip clutch 182. The slip clutch 182 slips in response to a torque of certain level or above to limit the level of the torque. As shown in FIG. 23, the slip clutch 182 is composed of a contact portion 133a as a radially outward portion of the second plate 133 and an elastic plate 183. The contact portion 133a is an annular and flat portion contacting a second friction surface 103b formed at the radially outward portion of the flywheel main body 103A. The second friction surface 103b is an annular flat surface formed on the transmission side in the axial direction of the radially outward portion of the flywheel main body 103A. The second friction surface 103b is located radially outward of the clutch friction surface 103a. Referring now to FIGS. 21 and 23, the elastic plate 183 is an annular plate member fixed to an axial surface on the engine side in the axial direction of the radially outward portion of the flywheel main body 103A and radially outward of the second friction surface 103b with a plurality of rivets 184. The elastic plate 183 is composed of a fix portion 183a on the radially outward side and an elastically urging portion 183b on the radially inward side. The elastically urging portion 183b urges the contact portion 133a of the second plate 133 against the second friction surface 103b.

Torque above which the slip clutch 182 starts to slip is set to be relatively large, because the slip clutch 182 is disposed at the radially outward portion of the flywheel main body 103A, and especially radially outward of the clutch surface 103a of the flywheel main body 103A. The slip clutch 182 is composed of only two members and makes use of a portion of the flywheel main body 103A as a friction surface, thereby realizing a simple structure. In addition, the slip clutch 182 has advantages of saving space and low cost.

An inner circumferential surface of the cylindrical portion 170 of the positioning member 103B is supported by an outer circumferential surface of the cylindrical portion 119a of the support member 119 through a bush 130. Accordingly, the positioning member 103B is supported in the radial direction or centered relative to the first flywheel 102 and the crankshaft 191 by the support member 119. The flywheel main body 103A is supported in the radial direction or centered relative to the first flywheel 102 and the crankshaft 191 through the positioning member 103B.

The bush 130 has a radial bearing portion 130a already described and a thrust bearing portion 130b disposed between the radially inner portion of the input disk-like plate 120 and a tip of the cylindrical portion 170 of the positioning member 103B. As a result, a thrust load from the second flywheel 103 is received by the members 111, 118, 119, and 120, which are aligned in the axial direction through the thrust bearing portion 130b. In other words, the thrust bearing portion 130b of the bush 130 functions as a thrust bearing supported by the radially inner portion of the input disk-like plate 120 for an axial load from the second flywheel 103.

When a large torque is input into the dual-mass flywheel 101, the slip clutch 182 slips to stop torque transmission between the damper mechanism 104 and the flywheel main body 103A. Therefore, the damper mechanism 104 is unlikely to be harmed. For example, if the operation torque of the slip clutch 182 is set to slip at a torque smaller than a torque capacity of the damper mechanism 104, a torque larger than the torque capacity is not input into the damper mechanism 104.

In this flywheel assembly, the second flywheel 103 is separated into the flywheel main body 103A and the positioning member 103B and the flywheel main body 103A rotates relative to the damper mechanism 104 and the positioning member 103B when the slip clutch 182 operates. Referring now to FIG. 20, at this time, the positioning member 103B does not rotate with the flywheel main body 103A so that the axial through holes 169a is kept in alignment with the bolts 122. As a result, even if the slip clutch 182 operates, it is possible to remove the bolts 122 without any special additional operations. In other words, it is easy to remove the flywheel assembly from the crankshaft 191.

A sliding area of the first friction generation mechanism 105 is set to be relatively large because the first friction generation mechanism 105 makes use of a part of the second flywheel 103 as a friction surface. Specifically, the second friction member 152 is urged against the second flywheel 103, or more specifically, against the positioning member 103B, by the cone spring 153. In other words, in this embodiment, it is possible to provide an adequate or superior friction sliding surface for the first friction generation surface 105 because the positioning member 103B is located on the transmission side in the axial direction of the output disk-like plate 133 even though the positioning member 103B rotates with the output disk-like plate 133. Accordingly, the pressure per area on the sliding surface is reduced so that the life of the first friction generation mechanism 105 is extended.

Referring again to FIG. 20, the first friction generation mechanism 105 is disposed radially inward of the clutch friction surface 103a of the second flywheel 103, apart from each other. Accordingly, the first friction generation mechanism 105 is unlikely to be affected by heat from the clutch friction surface 103a, thereby stabilizing frictional resistance.

3. Other Embodiments

Embodiments of the dual-mass flywheel in accordance with the present invention were described above, but the present invention is not limited to those embodiments. Other variations or modifications that do not depart from the scope of the present invention are possible. More particularly, the present invention is not limited by the specific numerical values of angles and the like described above.

In the above-described embodiment, two size types of the rotational direction gap of the engagement portion were used, but it is also possible to use three or more size types. In the case of three size types, the magnitude of the intermediate frictional resistance will have two stages (the case of the third embodiment described hereinafter).

The coefficients of friction of the first friction member and the second friction member are the same in the above-described embodiment, but these may also be varied. Thus, the ratio of the intermediate frictional resistance and large frictional resistance can be set by adjusting the frictional resistance generated by the first friction member and the second friction member according to the amount of resistance desired.

In the above-described embodiment, the intermediate frictional resistance is generated by providing the friction engagement member with an equal size and concavities with different sizes, but the concavities may be set to an equal size and the size of the friction engagement member may be different. Furthermore, combinations of the friction engagement members and concavities with different sizes may also be used.

In the above-described embodiment, the concavity of the friction washer faces the internal side in the radial direction, but it may face the external side in the radial direction.

In addition, the friction washer in the above-described embodiment has concavities, but the friction washer may also have convexities. In this case, the input side disk-like plate has concavities, for example.

Furthermore, the friction washer in the above-described embodiment has a friction surface that is frictionally engaged with an input member, but it may also have a friction surface that is frictionally engaged with an output member. In this case, an engagement portion having a rotational direction gap is formed between the friction washer and an input side member.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A flywheel assembly to which a torque is input from a crankshaft of an engine comprising:
    a flywheel having a first friction surface to transmit torque to a clutch disk and a second friction surface disposed radially inward of said first friction surface;
    a damper mechanism elastically connecting said flywheel to the crankshaft in a rotational direction, said damper mechanism including an input member, an output member, and elastic members elastically connecting said input member and said output member in the rotational direction; and
    a frictional resistance generation mechanism being arranged to operate functionally in parallel with said damper mechanism in said rotational direction, said frictional resistance generation mechanism utilizing said second friction surface to generate frictional resistance.

2. The flywheel assembly according to claim 1, wherein said frictional resistance generation mechanism includes,
    a friction member that is rotatable with said input member and contacts said flywheel, and
    an urging member that urges said friction member against said flywheel.

3. The flywheel assembly according to claim 2, wherein a radially inward portion of said friction member and radially outward portions of said elastic members overlap in an axial direction, and a radially outer edge of said friction member is radially outward that of radially inner edges of said elastic members.

4. A flywheel assembly to which a torque is input from a crankshaft of an engine, comprising:
    a flywheel;
    a damper mechanism elastically connecting said flywheel to the crankshaft in a rotational direction, said damper mechanism including an input member, an output member, and elastic members elastically connecting said input member and said output member in the rotational direction; and
    a frictional resistance generation mechanism being arranged to operate functionally in parallel with said damper mechanism in said rotational direction, said frictional resistance generation mechanism utilizing a portion of said flywheel as a friction surface, said frictional resistance generation mechanism including
        a first friction member being rotatable with said input member and contacting said output member,
        a second friction member being rotatable with said input member and contacting said flywheel, and
        an urging member respectively urging said first and second friction members against said output member and said flywheel.

5. The flywheel assembly according to claim 4, wherein radially inward portions of said first and second friction members and radially outward portions of said elastic members overlap in an axial direction, and a radial position of radially outer edges of the first and second friction members is radially outward that of radially inner edges of said elastic members.

6. The flywheel assembly according to claim 4, wherein only one of said first and second friction members is nonrotatably engaged with said input member, and said first and second friction members are nonrotatably engaged with each other.

7. A flywheel assembly to which a torque is input from a crankshaft of an engine, comprising:
a flywheel;
a damper mechanism elastically connecting said flywheel to the crankshaft in a rotational direction, said damper mechanism including an input member, an output member, and elastic members elastically connecting said input member and said output member in the rotational direction; and
a frictional resistance generation mechanism being arranged to operate functionally in parallel with said damper mechanism in said rotational direction, said frictional resistance generation mechanism utilizing a portion of said flywheel as a friction surface,
said input member being a disk plate member and said output member including a pair of disk plates disposed on axially opposite sides of said disk plate member,
said frictional resistance generation mechanism including
a first friction member being rotatable with said input member and contacts said output member,
a second friction member being rotatable with said input member and contacting said flywheel, and
an urging member urging said first and second friction members against one of said disk plates on a side axially opposite from said flywheel.

8. The flywheel assembly according to claim 7, wherein radially inward portions of said first and second friction members and radially outward portions of said elastic members overlap in an axial direction, and a radial position of radially outer edges of the first and second friction members is radially outward that of radially inner edges of said elastic members.

9. The flywheel assembly according to claim 8, wherein said first friction member is nonrotatably engaged with said input member, and said first and second friction members are nonrotatably engaged with each other.

10. The flywheel assembly according to claim 9, wherein said first friction member has an annular portion that slidably contacts said disk plate member in the rotational direction, and a plurality of engagement portions that axially extends from said annular portion and engages with said input member such that said engagement portions cannot rotate and can move in the axial direction relative to said input member, and
said second friction member has a plurality of engagement parts engaged with said engagement portions such that said engagement parts and said engagement portions cannot rotate and can move in the axial direction relative to each other.

11. The flywheel assembly according to claim 10, wherein said urging member is located between said second friction member and said engagement portions of said first friction member.

12. The flywheel assembly according to claim 11, wherein said frictional resistance generation mechanism further includes a receiving member supported on a tip of said engagement portions of said first friction member configured to receive an urging force from said urging member.

13. The flywheel assembly according to claim 1, wherein said frictional resistance generation mechanism generates friction over an entire torsional angle range of said damper mechanism.

14. A flywheel assembly to which a torque is input from a crankshaft of an engine, comprising:
a flywheel;
a damper mechanism elastically connecting said flywheel to the crankshaft in a rotational direction, said damper mechanism including an input member, an output member, and elastic members elastically connecting said input member and said output member in the rotational direction; and
a frictional resistance generation mechanism being arranged to operate functionally in parallel with said damper mechanism in said rotational direction, said frictional resistance generation mechanism utilizing a portion of said flywheel as a friction surface, said frictional resistance generation mechanism being located radially inward of a radial center of said elastic members of said damper mechanism.

15. The flywheel assembly according to claim 14, wherein said flywheel is formed with a clutch friction surface with which a clutch is frictionally engaged, and
said elastic members of said damper mechanism are located radially inward of said clutch friction surface.

16. The flywheel assembly according to claim 14, further comprising a plurality of bolts arranged in a circumferential direction to fix said input member to said crankshaft, and
said frictional resistance generation mechanism is located radially outward of radially outer edges of said bolts.

17. A flywheel assembly to which a torque is input from a crankshaft of an engine, comprising:
a flywheel;
a damper mechanism elastically connecting said flywheel to the crankshaft in a rotational direction, said damper mechanism including an input member, an output member, and elastic members elastically connecting said input member and said output member in the rotational direction; and
a frictional resistance generation mechanism being arranged to operate functionally in parallel with said damper mechanism in said rotational direction, said frictional resistance generation mechanism utilizing a portion of said flywheel as a friction surface,
said flywheel being formed with a clutch friction surface with which a clutch is frictionally engaged, and
said frictional resistance generation mechanism being located radially inward of said clutch friction surface.

18. The flywheel assembly according to claim 17, wherein said flywheel has a portion including said clutch friction surface and a portions including said friction surface of said frictional resistance generation mechanism.

19. The flywheel assembly according to claim 17, wherein said flywheel has a flywheel main body formed with said clutch friction surface, and a second member formed with said friction surface of said frictional resistance generation mechanism.

20. The flywheel assembly according to claim 19, wherein said second member supports said flywheel main body in a radial direction relative to a member on the crankshaft side.

21. The flywheel assembly according to claim 19, wherein said second member is rotatable relative to said flywheel main body.

22. The flywheel assembly according to claim 19, wherein said second member is an annular plate.

23. A flywheel assembly to which a torque is input from a crankshaft of an engine, comprising:
a flywheel;
a damper mechanism elastically connecting said flywheel to the crankshaft in a rotational direction, said damper mechanism including an input member, an output member, and elastic members elastically connecting said input member and said output member in the rotational direction; and a frictional resistance generation mechanism being arranged to operate functionally in parallel with said damper mechanism in said rotational direction, said frictional resistance generation mechanism utilizing a portion of said flywheel as a friction surface, said output member and said flywheel being connected by a slip clutch, said slip clutch being configured to allow relative rotation only when torque between said output member and said flywheel exceeds or is equal to a torque capacity of said damper mechanism.

24. The flywheel assembly according to claim 23, wherein said slip clutch is arranged radially outside a friction surface of said flywheel configured to contact a friction facing of a clutch disk.

25. A flywheel assembly to which a torque is input from a crankshaft of an engine, comprising:

a flywheel being supported by a support member being fixed to the crankshaft, said flywheel being rotatable relative to the crankshaft;

a damper mechanism elastically connecting said flywheel to the crankshaft in a rotational direction, said damper mechanism including an input member being fixed to the crankshaft, an output member being fixed to said flywheel and being supported by the support member via the flywheel, elastic members elastically connecting said input member and said output member in said rotational direction; and a frictional resistance generation mechanism being arranged to operate functionally in parallel with said damper mechanism in said rotational direction, said frictional resistance generation mechanism having an output rotation member nonrotatably engaged with said output member and having a friction surface, said output rotation member being located on an axial side of said output member opposite a crankshaft side.

26. The flywheel assembly according to claim 25, said output rotation member is an annular plate member.

27. A flywheel assembly configured to transmit torque from a crankshaft of an engine to a transmission, comprising:

a flywheel being supported by a support member fixed to the crankshaft, said flywheel being rotatable relative to the crankshaft;

a damper mechanism elastically connecting said flywheel to the crankshaft, said damper mechanism having
an input member being fixed to the crankshaft,
an output member being fixed to said flywheel, and
elastic members elastically connecting said input member to said output member within a certain angle; and a thrust bearing having a cylindrical portion being disposed between said support member and an engine side tip of said flywheel in an axial direction to receive an axial load from said flywheel at a common radial position of said support member and said flywheel.

28. The flywheel assembly according to claim 27, wherein said cylindrical portion extends toward the engine in said axial direction at a radially inner edge thereof.

29. The flywheel assembly according to claim 28, further comprising a cylindrical member fixed to the crankshaft and located radially inward of said cylindrical portion, and a radial bearing disposed between said cylindrical member and said cylindrical portion to receive a radial load from said flywheel.

30. The flywheel assembly according to claim 27, wherein a portion of said disk member corresponding to said thrust bearing directly contacts the crankshaft or interposes other members with the crankshaft without axial space therebetween.

31. A flywheel assembly configured to transmit a torque from a crankshaft of an engine to a transmission through a clutch, comprising:

a flywheel being formed with an annular friction surface with which the clutch is frictionally engaged;

a first elastic member being configured to connect elastically said flywheel to the crankshaft within a certain angle, a radial position of said first elastic member being radially inward of said friction surface, said first elastic member being configured to be compressed in a compression angle being defined by relative rotation between said flywheel and the crankshaft, said compression angle having at least a small area and a large area, said small area being smaller than said large area; and a second elastic member being located between said flywheel and the crankshaft to operate in parallel with said first elastic member, said second elastic member being compressed only in said large area of said compression angle, a radial position of said second elastic member is within an annular area defined by said friction surface.

32. The flywheel assembly according to claim 31, further comprising a first member fixed to the crankshaft to support said first and second elastic members, and a second member fixed to said flywheel to support said first and second elastic member, and portions of said first member and said second member constitute a stopper by abutting with each other when a torsional angle of said first and second elastic members becomes large.

33. The flywheel assembly according to claim 32, wherein a radial position of said stopper is within said annular area defined by said friction surface.

34. The flywheel assembly according to claim 33, wherein a radial position of said stopper is the same as that of said second elastic member.

35. The flywheel assembly according to claim 34, wherein said first member is a disk member formed with a plurality of partitions arranged in the circumferential direction, said second elastic member and a part of said second member are located in spaces between said partitions, said second elastic member and said part of said second member are located in different spaces, and said partitions and said part of said second member constitute said stopper.

36. The flywheel assembly according to claim 31, wherein said first and second elastic members are coil springs, and a coil diameter of said second elastic member is smaller than that of said first elastic member.

37. The flywheel assembly according to claim 36, coil diameter of said second elastic member is 0.3 to 0.7 times than that of said first elastic member.

38. The flywheel assembly according to claim 31, wherein torsional rigidity of said second elastic member is higher than that of said first elastic member.

39. The flywheel assembly according to claim 38, wherein torsional rigidity of said second elastic member is two times or more than that of said first elastic member.

* * * * *